US011970881B2

(12) United States Patent
Fiedler et al.

(10) Patent No.: US 11,970,881 B2
(45) Date of Patent: Apr. 30, 2024

(54) CLOSING DEVICE WITH ELECTRICAL CONTACTS

(71) Applicant: Fidlock GmbH, Hannover (DE)

(72) Inventors: Joachim Fiedler, Hannover (DE); Breido Botkus, Hannover (DE)

(73) Assignee: Fidlock GmbH, Hannover (DE)

( * ) Notice: Subject to any disclaimer, the term of this patent is extended or adjusted under 35 U.S.C. 154(b) by 702 days.

(21) Appl. No.: 16/630,735

(22) PCT Filed: Jul. 6, 2018

(86) PCT No.: PCT/EP2018/068439
§ 371 (c)(1),
(2) Date: Jan. 13, 2020

(87) PCT Pub. No.: WO2019/011820
PCT Pub. Date: Jan. 17, 2019

(65) Prior Publication Data

US 2021/0396044 A1 Dec. 23, 2021

(30) Foreign Application Priority Data

Jul. 14, 2017 (DE) ........................ 102017212151.3

(51) Int. Cl.
*E05B 47/00* (2006.01)
*A44B 17/00* (2006.01)
*A45C 13/10* (2006.01)

(52) U.S. Cl.
CPC ........ *E05B 47/004* (2013.01); *A44B 17/0017* (2013.01); *A45C 13/1069* (2013.01)

(58) Field of Classification Search
CPC ........ E05B 47/00; E05B 47/004; Y10T 24/32; A45C 13/1069; A44B 17/0017
See application file for complete search history.

(56) References Cited

U.S. PATENT DOCUMENTS 6,295,702 B1 10/2001 Bauer
10,383,409 B2 * 8/2019 Fiedler .................. A44B 11/25
(Continued)

FOREIGN PATENT DOCUMENTS

DE 102010044144 B3 5/2012
DE 102013213633 A1 1/2015
(Continued)

OTHER PUBLICATIONS

Machine Translation of WO 2012/066146 produced from EPO website (Year: 2022).*

*Primary Examiner* — Victor D Batson
*Assistant Examiner* — Michael S Lee
(74) *Attorney, Agent, or Firm* — The Webb Law Firm

(57) ABSTRACT

A closing device has a first closing part which has a housing and a blocking piece disposed on the housing; a second closing part which has a sprung locking element which at least in portions is configured so as to be spring-elastic; and a magnetic element which acts between the blocking piece of the first closing part and the second closing part and causes a magnetic attraction force between the blocking piece of the first closing part and the second closing part. The first closing part for closing the closing device is capable of being placed on the second closing part in a closing direction. The blocking piece and the sprung locking element in a closing position are mutually engaged such that the first closing part in the direction counter to the closing direction is locked in relation to the second closing part.

15 Claims, 28 Drawing Sheets

(56) References Cited

U.S. PATENT DOCUMENTS

| | | | |
|---|---|---|---|
| 2010/0308605 | A1 | 12/2010 | Fiedler |
| 2012/0124786 | A1 | 5/2012 | Fiedler |
| 2016/0183642 | A1 | 6/2016 | Fiedler |

FOREIGN PATENT DOCUMENTS

| | | | |
|---|---|---|---|
| WO | 2009092368 | A2 | 7/2009 |
| WO | 2012066146 | A1 | 5/2012 |

* cited by examiner 311A
311B 225A
225B 22
226B
225A
2

CLOSING DEVICE WITH ELECTRICAL CONTACTS

CROSS-REFERENCE TO RELATED APPLICATIONS

This application is the United States national phase of International Application No. PCT/EP2018/068439 filed Jul. 6, 2018, and claims priority to German Patent Application No. 102017212151.3 filed Jul. 14, 2017, the disclosures of which are hereby incorporated by reference in their entirety.

BACKGROUND OF THE INVENTION

Field of the Invention

The disclosure relates to a closing device.

Prior Art

A closing device of this type has a first closing part which comprises a housing and a blocking piece disposed on the housing; a second closing part which comprises a sprung locking element which at least in portions is configured so as to be spring-elastic; and magnetic means which act between the blocking piece of the first closing part and the second closing part and cause a magnetic attraction force between the blocking piece of the first closing part and the second closing part. The first closing part for closing the closing device is placed on the second closing part in a closing direction, wherein the locking procedure is magnetically facilitated by virtue of the magnetic attraction force of the magnetic means between the blocking piece of the first closing part and the second closing part. The blocking piece and the sprung locking element in a closing position are then mutually engaged such that the closing part in the direction counter to the closing direction is locked in relation to the second closing part. The blocking piece and the sprung locking element in the closing position thus form a positive-lock counter to the closing direction such that the blocking piece in the closing position is held in a latching manner on the sprung locking element. The sprung locking element for releasing the closing device is displaced relative to the blocking piece in an opening direction that is substantially transverse to the closing direction so as to in this way disengage the sprung locking element and the blocking piece.

In the case of such a closing device as is known, for example, from WO 2009/092368 A2, the locking is performed in a magnetically facilitated manner in that the placing of the first closing part on the second closing part and the latching engagement of the blocking piece with the sprung locking element is magnetically facilitated. The first closing element for locking the closing device is placed on the second closing part in the closing direction, and a latching engagement between the blocking piece and the sprung locking element is established on account thereof. For opening, the sprung locking element by moving the second closing part, or at least part of the second closing part, in the opening direction, is moved in a rectilinear manner substantially transverse to the closing direction such that the blocking piece in this way is disengaged from the sprung locking element and the first closing part can be removed from the second closing part.

A closing device of this type can be used in diverse ways for connecting two components to one another, wherein one of the components is connected to the first closing part, and the other component is connected to the second closing part, and the components are coupled to one another in a reliable and releasable manner by way of the mutually latching locking mechanism of the closing parts.

Closing devices of this type in the closing position thereof make available a reliable load-bearing connection between two parts and can be closed in a simple manner and be opened again in a manner that is pleasant in tactile terms. The application possibilities of closing devices of this type extend to devices generally suitable for (releasably) connecting two components such as closures of bags, flaps, or covers, connection devices for belts or ropes, or else entirely different components.

The blocking piece of the first closing part in the case of the closing device of WO 2009/092368 A2 projects from the housing of the first closing part so as to be able to establish an engagement between the blocking piece of the first closing part and the sprung locking element of the second closing part, but on account thereof can be unappealing and obstructive in the case of an opened closing device.

SUMMARY

It is an object underlying the proposed solution to provide a closing device in which the blocking piece in an opened position of the closing device is ideally not obstructive in terms of using a component that is connected to the first closing part.

This object is achieved by a closing device having features as described herein.

It is accordingly provided that the blocking piece is disposed so as to be movable on the housing of the first closing part in such a manner that said blocking piece in the retracted position is at least in part enclosed in a receptacle chamber of the housing, and in a deployed position projects from the housing in such a manner that said blocking piece can be brought to engage with the sprung locking element.

The proposed solution proceeds from the concept of disposing the blocking piece so as to be movable on the housing of the first closing part. The blocking piece in a retracted position is largely disposed in the housing and thus does not project from the housing, or does at least not completely project from the housing. The blocking piece in an open position of the closing device is situated in the retracted position and is thus not obstructive or disturbing when using a component that is connected to the first closing part. The blocking piece when closing the closing device is transferred from the retracted position thereof to the deployed position, and in this deployed position projects from the housing in such a manner that said blocking piece can be brought to engage with the sprung locking element and for locking the first closing part by way of the second closing part can be placed in a latching manner on the sprung locking element.

Moreover, at least one first electrical contact element is disposed on the blocking piece, and at least one second electrical contact element is disposed on the second closing part. Electrical contacting can thus be provided by way of the closing device in that a contact element of the blocking piece, on the one hand, and a contact element of the second closing part, on the other hand, are in mutual electrical contact in the closing position, and a current can thus be transmitted between the closing parts.

The transferring of the blocking piece from the retracted position to the deployed position is preferably performed in a self-acting manner on account of the effect of the magnetic means which act in a magnetically attracting manner between the blocking piece and the second closing part. When the first closing part is placed on the second closing part, the magnetic means thus generate a magnetic attraction force between the blocking piece on the first closing part and the second closing part, and transfer the blocking piece from the retracted position thereof to the deployed position such that the blocking piece can be mechanically latched to the sprung locking element and the closing device can be locked in this way.

The magnetic means can be configured, for example, by two (permanent) magnets of which the one is disposed on the blocking piece and the other is disposed on the second closing part. However, it is also conceivable for a magnet to be provided on one of the blocking piece or the second closing part, and a magnetic armature from a ferromagnetic material, for example iron, to be provided on the respective other one of the blocking piece and the second closing part.

The magnetic means are advantageously dimensioned such that the blocking piece, when placing the first closing part on the second closing part, is held in the deployed position for bringing the blocking piece to engage in a latching manner with the sprung locking element. The background hereto lies in that the blocking piece, when placing the blocking piece on the sprung locking element, urges the sprung locking element aside in an elastic manner so as to bring the blocking piece by way of a latching portion in a positive-locking manner to engage with a corresponding latching portion on the sprung locking element. The force required for urging aside the sprung locking element herein should be lower than the magnetic attraction force of the magnetic means such that the blocking piece when brought to engage in a latching manner is held in the deployed position thereof and is not urged to the retracted position thereof by virtue of the force required for establishing the latching action.

In order for the blocking piece after the opening of the closing device to be reset in a self-acting manner to the retracted position of said blocking piece, it can be provided for the blocking piece in relation to the housing of the first closing part to be pretensioned in the direction of the retracted position. To this end, separate magnetic pretensioning means which act between the blocking piece and the housing of the first closing part and exert a magnetic attraction force on the blocking piece in the direction of the retracted position can be provided. This magnetic attraction force herein, at least when the first closing part has moved sufficiently close to the second closing part, should be lower than the magnetic attraction force of the magnetic means acting between the blocking piece and the second closing part, so that said magnetic means can reliably transfer the blocking piece to the deployed position thereof when placing the first closing part on the second closing part.

The pretensioning can also be caused by a mechanical spring which acts between the blocking piece and the housing of the first closing part and after the opening of the closing device resets the blocking piece to the retracted position thereof.

An adjustment element which is mounted on a housing of the second closing part so as to be displaceable along the opening direction can be provided on the second closing part. The sprung locking element is disposed on said adjustment element such that the sprung locking element can be moved relative to the blocking piece of the first closing part by activating the adjustment element. The sprung locking element in the closing position is engaged with the blocking piece such that the first closing part is held on the second closing part. The adjustment element for opening the closing device can then be activated in such a manner that the sprung locking element is moved relative to the blocking piece and disengages from the blocking piece.

Said adjustment element can be configured, for example, in the manner of a slide and be mounted on the housing of the second closing part, wherein the adjustment element is adjustable relative to the housing in the direction of the opening direction, and the sprung locking element is moved relative to the housing by activating the adjustment element. The opening of the closing device is thus not performed by way of an overall movement of the second closing part, but by activating the adjustment element of the second closing part, by virtue of which the engagement between the blocking piece and the sprung locking element is released and the first closing part can be retrieved from the second closing part.

The magnetic means in this case advantageously act between the blocking piece of the first closing part and the adjustment element of the second closing part such that the magnetic means also exert a force on the adjustment element in such a manner that the adjustment element, by virtue of the magnetic attraction force acting between the blocking piece and the adjustment element when placing the first closing part on the second closing part, is adjusted to such a position in which the blocking piece can be brought to engage with the sprung locking element.

The sprung locking element advantageously extends in a circumferential direction about the closing direction and is configured, for example, as a strip that is bent about the closing direction and is sprung at least in portions, a latching portion for engaging in a latching manner with a corresponding latching portion on the blocking piece being disposed on said strip. The sprung locking element in the closing position encompasses the blocking piece at least in portions in the circumferential direction such that the blocking piece on account of said encompassing action is held on the sprung locking element.

The sprung locking element is at least in portions circumferentially opened in the opening direction such that the blocking piece on account of a relative movement between the sprung locking element and the blocking piece can be released from the encompassing action by way of the sprung locking element.

In order for the blocking piece to be placed on the sprung locking element for locking the first closing part relative to the second closing part, the blocking piece is thus placed on the sprung locking element in the closing direction and herein urges aside the sprung locking element in an elastic manner in the direction of an expansion transverse to the closing direction, such that the sprung locking element comes to engage in a latching manner with the blocking piece and in a locked engagement position encompasses the blocking piece along the circumferential direction. The sprung locking element for releasing is then moved relative to the blocking piece in the opening direction so that the blocking piece disengages from the sprung locking element on account of a relative movement transverse to the closing direction.

The at least one first electrical contact element and the at least one second electrical contact element in the closing position of the closing device are preferably in mutual electrical contact. The at least one first electrical contact element of the blocking piece in the closing position thus bears on the assigned at least one second electrical contact element of the second closing part such that an electrical connection is achieved between the closing parts.

The blocking piece can have one or a plurality of electrical contact elements. For example, two first contact elements which in the closing position electrically contact two assigned second contact elements of the second closing part can be disposed on the blocking piece. Currents of dissimilar polarity (+, −) can be transmitted between the closing parts in this way.

The blocking piece in the deployed position preferably contacts a contact element of the housing of the first closing part. To this end, an additional electrical contact (in addition to the first contact element) which in the deployed position of the blocking piece contacts the contact element of the housing such that a current flow can be directed from the housing to the blocking piece and up to the first contact element of the blocking piece can be configured on the blocking piece. By contrast, the blocking piece in the retracted position does not contact the contact element of the housing such that the blocking piece is not energized in the retracted position.

In an alternative design embodiment it can also be provided that a switch, for example a reed switch, which switches the blocking piece so as to be non-energized in the retracted position is provided.

In one further design embodiment a contact element which in the closing position contacts an assigned contact element of the second closing part can also be disposed on the housing of the first closing part. Electrical contacting between the closing parts is thus also established independently of the blocking piece between the housing of the first closing part and the second closing part. For example, currents of dissimilar polarity can in this way be transmitted by way of the blocking piece, on the one hand, and by way of the additional contact on the housing, on the other hand.

In one further design embodiment, a further contact element which does not contact the contact element of the second closing part can also be disposed on the housing of the first closing part in addition to a first contact element (which in the closing position contacts an assigned contact element of the second closing part). Electrical contacting between the first contact element and the further contact element disposed on the housing takes place by way of a bridging contact element which is disposed on the blocking piece and only in the deployed position of the blocking piece establishes an electrical connection, wherein the blocking piece per se remains non-energized. The first contact element disposed on the housing is thus switched so as to be non-energized, when the blocking piece is situated in the retracted position. Multipolar arrangements can also be implemented by disposing an arbitrary number of said connections.

BRIEF DESCRIPTION OF THE DRAWINGS

The concept on which the solution is based is to be explained in more detail hereunder by means of the embodiments illustrated in the figures.

DESCRIPTION OF THE INVENTION

Figure 1:
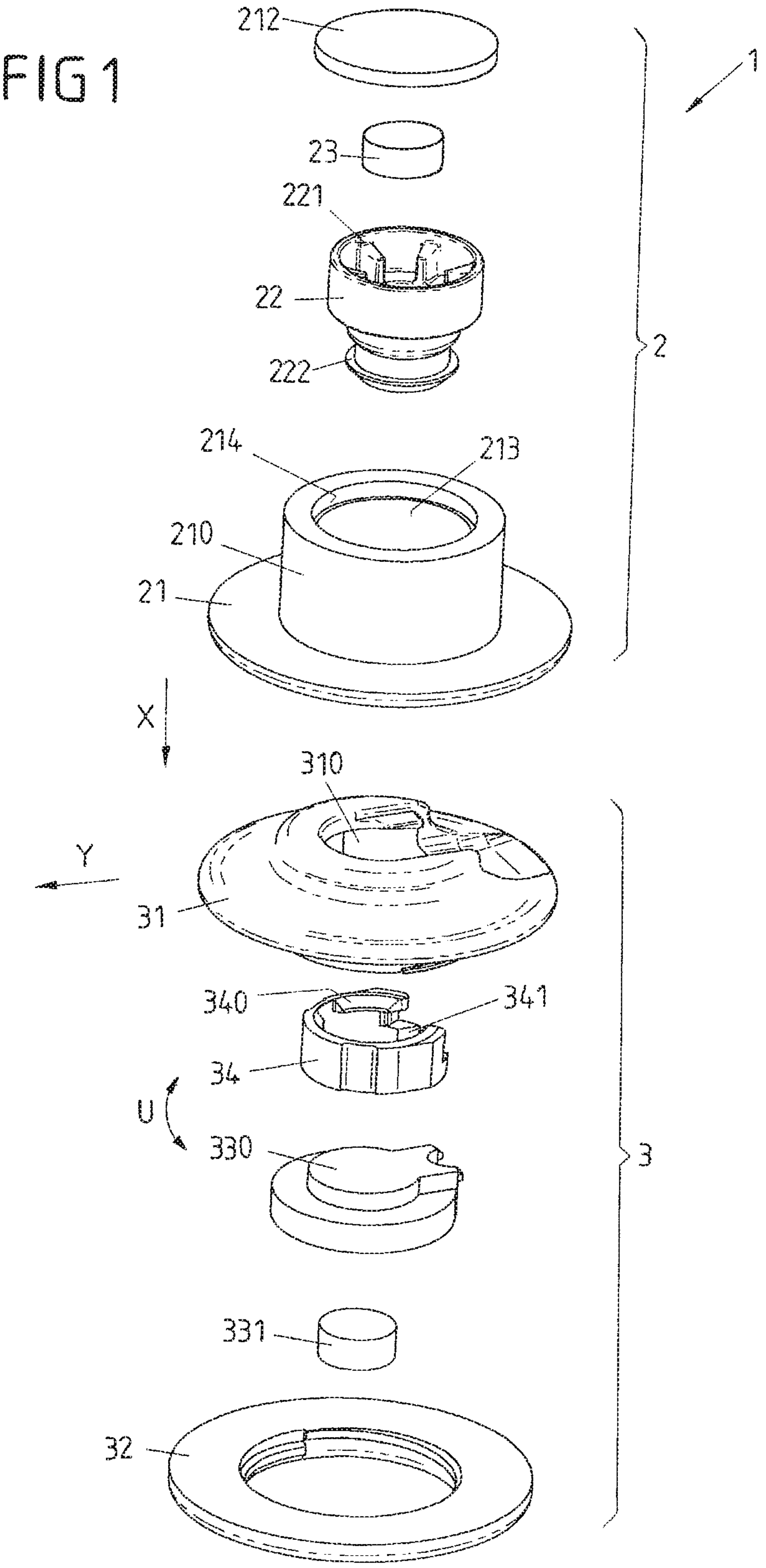
FIG. 1 shows an exploded view of a closing device.
Figure 2:
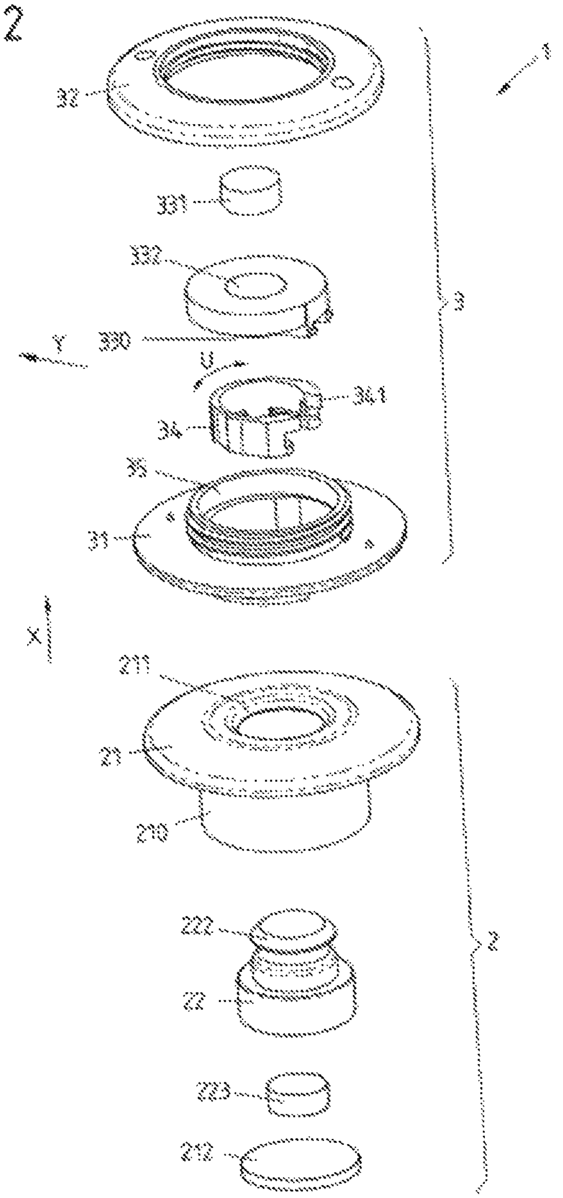
FIG. 2 shows an exploded view of the closing device according to FIG. 1, when viewed in another perspective.

A first embodiment of a closing device 1, illustrated in FIGS. 1 to 6, has a first closing part 2 and a second closing part 3 which in an opened position are present so as to be mutually separated, and for closing in a closing direction X can be placed on one another, and in a closing position are locked to one another.

The first closing part 2 comprises a housing 21 having a housing portion 210 which encloses a receptacle chamber 213. A blocking piece 22 is disposed so as to be displaceable in said receptacle chamber 213.

The second closing part 3 comprises a housing 31, a housing part 32 being placed thereon. A holding portion 330 which holds a sprung locking element 34 in a rotationally fixed manner on a receptacle opening 310 of the housing 31 is disposed on the housing 31.

When using the closing device 1 for closing a bag, for example, a portion of a bag cover can be held in a clamped manner between the housing 31 and the housing part 32.

The blocking piece 22 disposed on the housing 21 of the first closing part 2, and the sprung locking element 34 disposed on the housing 31 of the second closing part 3, serve for mechanically locking the first closing part 2 to the second closing part 3 in a closing position. To this end, the blocking piece 22 and the sprung locking element 34 have in each case one or a plurality of latching portions 222, or

340, respectively, which for locking the first closing part 2 to the second closing part 3 can be brought to mutually engage in a latching manner, and in the closing position cause a positive-locking connection between the blocking piece 22 and the sprung locking element 34.

The first closing part 2 can be placed on the second closing part 3 in a closing direction X, so as to transfer the closing device 1 to the closing position thereof, as is to be explained in detail hereunder by means of FIGS. 3 to 6. The sprung locking element 34 herein extends in a circumferential direction U about the closing direction X and in portions is circumferentially opened by an opening 341. This has the effect that the blocking piece 22 can be placed on the sprung locking element 34 in the closing direction X in a comparatively simple manner without a great effort in terms of force, on the one hand, in that the blocking piece 22 by way of the latching portion 222 thereof (which circumferentially runs about the blocking piece 22) is placed in the closing direction X on the latching portion 340 of the sprung locking element 34, and on account thereof expands the sprung locking element 34 transversely to the closing direction X such that the latching portion 222 of the blocking piece 22 comes to engage in a latching manner with the latching portion 340 of the sprung locking element 34.

For opening, the sprung locking element 34 is displaced relative to the blocking piece 22 in an opening direction Y which is directed so as to be substantially transverse to the closing direction X such that the blocking piece 22 is guided through the circumferential opening 341 on the sprung locking element 34 and disengages from the sprung locking element 34.

Figure 3A:
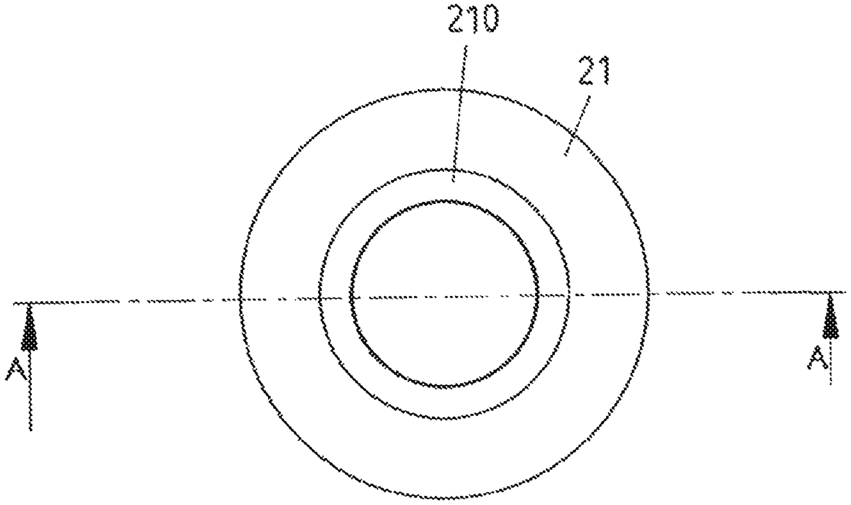
FIG. 3A shows a plan view of the closing device prior to the closing.
Figure 3B:
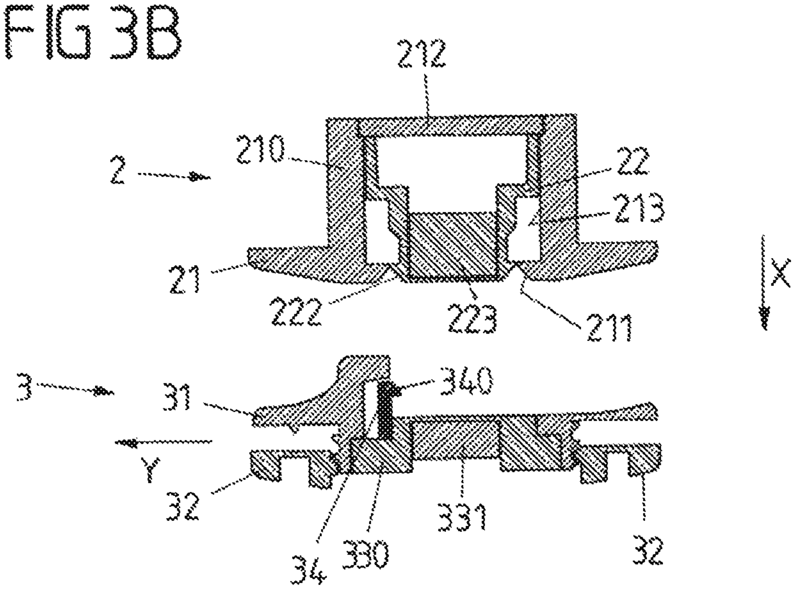
FIG. 3B shows a sectional view of the assembly according to FIG. 3A along the line A-A.

FIGS. 3A and 3B show the closing device 1 prior to the closing of the closing device 1. The blocking piece 22 in this state is retracted into the receptacle chamber 213 of the housing 21 and is thus in a retracted state in which said blocking piece 22 does not protrude outward from the housing 21. A magnet 212 which in a magnetically attracting manner is opposite a magnet 223 of the blocking piece 22 (see FIG. 3*b*) is disposed on a receptacle opening 214 of the housing portion 210. The blocking piece 22 in the opened position of the closing device 1, by virtue of the magnetic attraction force between the magnets 212, 223, is initially held in the retracted position of said blocking piece 22.

Figure 4A:
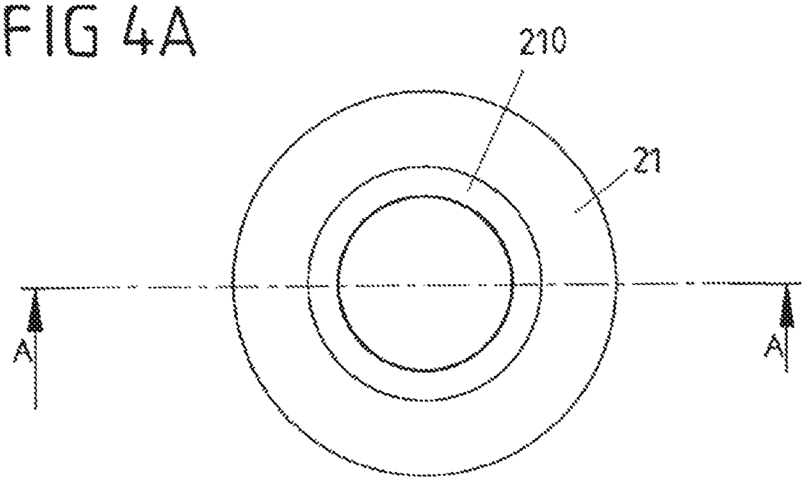
FIG. 4A shows a plan view of the closing device prior to the closing.
Figure 4B:
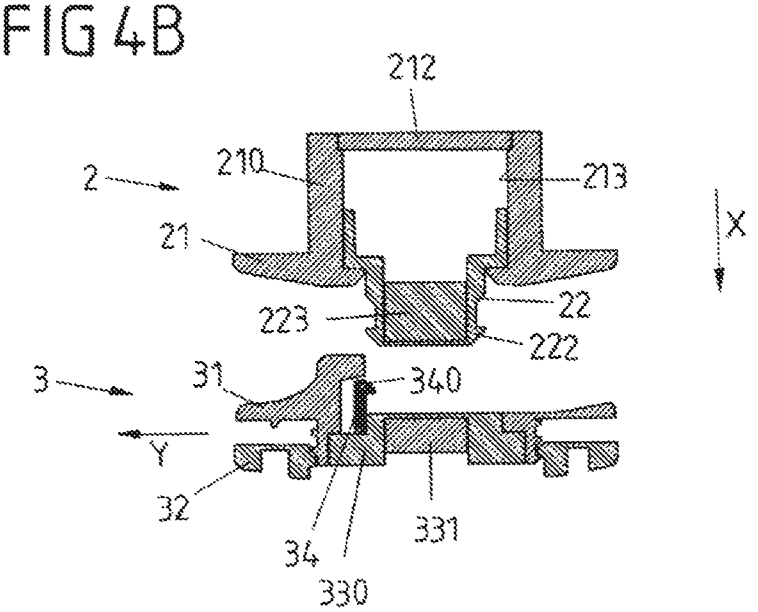
FIG. 4B shows a sectional view through the assembly according to FIG. 4A along the line A-A.

When the first closing part 2 is moved closer to the second closing part 3 in the closing direction X, as is illustrated in FIGS. 4A and 4B, the blocking piece 22 is transferred from the retracted position thereof to a deployed position as is illustrated in FIG. 4B. This takes place in an automated manner by virtue of a magnetic attraction force between the magnet 223 which is disposed on the blocking piece 22 and a magnet 331 which is disposed on the holding portion 330 on the housing 31 of the second closing part 3.

The blocking piece 22 in the deployed position extends through an opening 211 on the housing 21, and projects outward from the housing 21. The blocking piece 22 herein bears on the peripheral portion of the opening 211 which delimits the receptacle chamber 213 in the closing direction X such that a terminal position for the deployed position is defined on account of the rim of the opening 211.

The magnets 223, 331 implement magnetic means for generating an attraction force between the blocking piece 22 and the second closing part 3, and fulfil two functions. On the one hand, the magnetic means 223, 331 have the effect that the blocking piece 22 from the retracted position thereof (see FIG. 3B) is transferred to the deployed position thereof (see FIG. 4B) when placing the first closing part 2 on the second closing part 3. On the other hand, the magnetic means 223, 331 generate a magnetic attraction force which magnetically facilitates the closing of the closing device 1 and draws the blocking piece 22 so as to engage with the sprung locking element 34 such that the mechanical latching of the blocking piece 22 to the sprung locking element 34 in the case of the suitable dimensioning of the magnets 223, 331 can be established in a largely self-acting manner.

The magnetic means in the form of the magnets 223, 331 are dimensioned such that the blocking piece 22 when placing the blocking piece 22 on the sprung locking element 34 is not reset to the retracted position of said blocking piece 22, but that the latching portion 222 of the blocking piece 22 can come to engage with the latching portion 340 of the sprung locking element 34, and to this end can urge aside the sprung locking element 34 in the direction of an expansion.

Figure 5A:
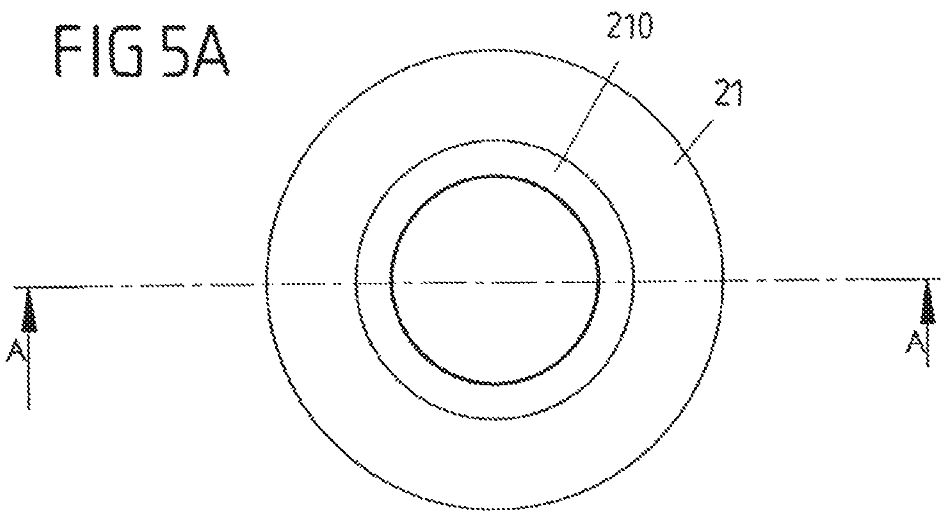
FIG. 5A shows a plan view of the closing device in a closing position.
Figure 5B:
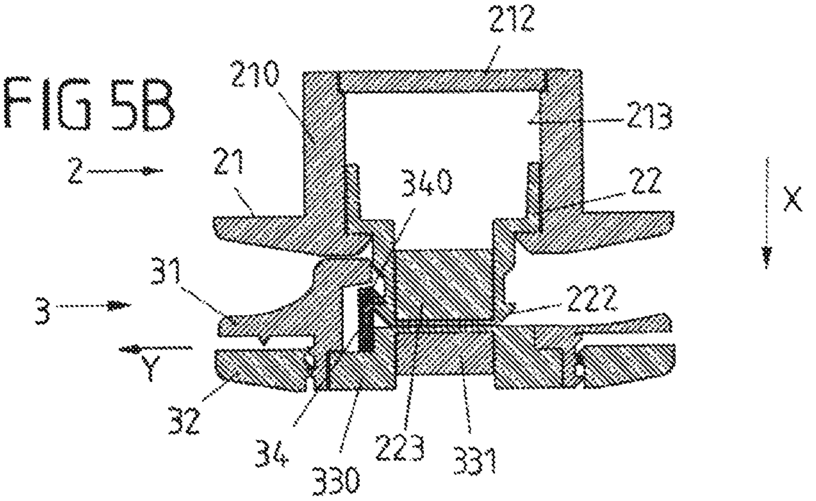
FIG. 5B shows a sectional view through the assembly according to FIG. 5A along the line A-A.

FIGS. 5A and 5B show the closing device 1 in the closing position thereof, in which the latching portions 222, 340 of the blocking piece 22 and of the sprung locking element 34 are mutually engaged in a latching manner such that the first closing part 2 by way of the engagement of the blocking piece 22 with the sprung locking element 34 is held in a mechanically latching manner on the second closing part 3.

Figure 6A:
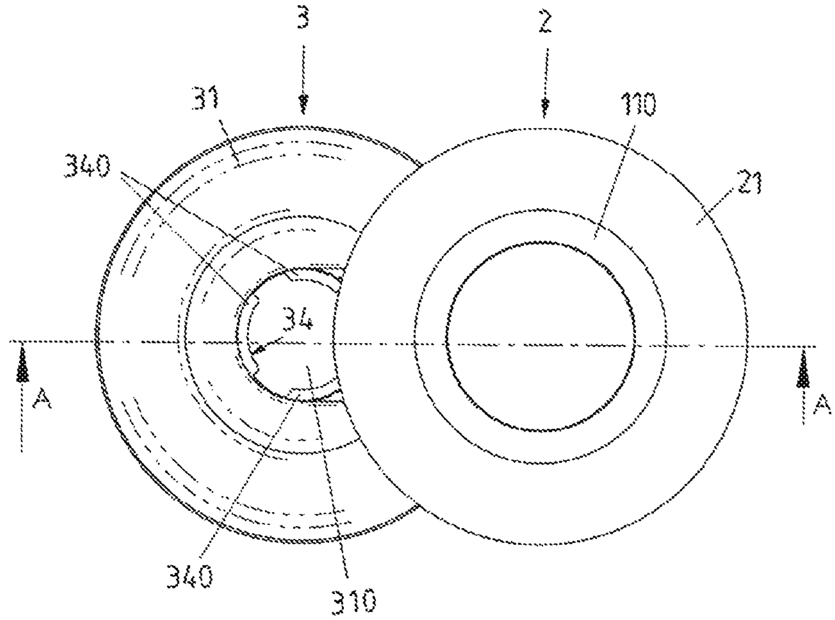
FIG. 6A shows a plan view of the closing device in the unlocked state.
Figure 6B:
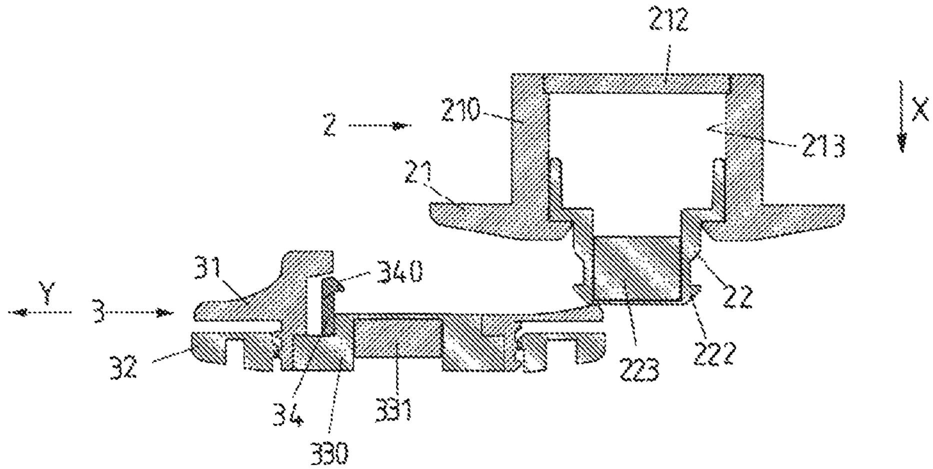
FIG. 6B shows a sectional view of the assembly according to FIG. 6A along the line A-A.

For opening the closing device 1, the blocking piece 22 and the sprung locking element 34 are displaced relative to one another along the opening direction Y, as is illustrated in FIGS. 6A and 6B. To this end, the second closing part 3 conjointly with the sprung locking element 34 in the opening direction Y is moved relative to the first closing part 2 having the blocking piece 22 disposed thereon such that the blocking piece 22 passes through the circumferential opening 341 on the sprung locking element 34 and disengages from the sprung locking element 34.

The first closing part 2 in the unlocked state, illustrated in FIGS. 6A and 6B, is no longer held on the second closing part 3 such that the closing parts 2, 3 can be retrieved from one another.

By retrieving the first closing part 2 from the second closing part 3, the magnets 223, 331 on the blocking piece 22, or on the housing 31, respectively, are moreover removed from one another such that the magnetic attraction force between said magnets 223, 331 is weakened. Once the first closing part 2 is sufficiently far removed from the second closing part 3, the magnetic attraction force of the magnets 212, 223 acting between the housing 21 of the first closing part 2 and the blocking piece 22 exceeds the magnetic attraction force of the magnets 223, 331 such that the blocking piece 22, by virtue of the magnetic attraction force between the magnets 212, 223, is drawn toward the magnet 212 on the housing portion 210 of the housing 21 of the first closing part 2, and is thus transferred to the retracted position of said blocking piece 22 (see FIG. 3B).

As mentioned, the blocking piece 22 in the retracted position, then no longer projects outward from the housing 21, or at least not in a disturbing manner, such that the blocking piece 22 is not obstructive when handling a component to which the first closing part 2 is connected, and moreover does not compromise the aesthetic overall appeal of said component (for example in the use on a handbag or the like).

FIGS. 7 to 12 show a further embodiment of a closing device 1 which from the embodiment according to FIGS. 1 to 6 differs substantially in that two blocking pieces 22*a*, 22*b* are provided on a housing 21 of a first closing part 2, and two sprung locking elements 34*a*, 34*b* are provided on a housing 31 of a second closing part 3, and thus a double mechanical locking mechanism can be established between the closing parts 2, 3. Components of equivalent function hereunder are to be provided with the same reference signs as above, to the extent as this is deemed expedient.

The first closing part 2 has two blocking pieces 22*a*, 22*b* which on a housing portion 210 of the housing 21 are in each case disposed in one receptacle chamber 213*a*, 213*b*. Each blocking piece 22*a*, 22*b* has a latching portion 222*a*, 222*b* and supports a magnet 223*a*, 223*b*.

Figure 7:
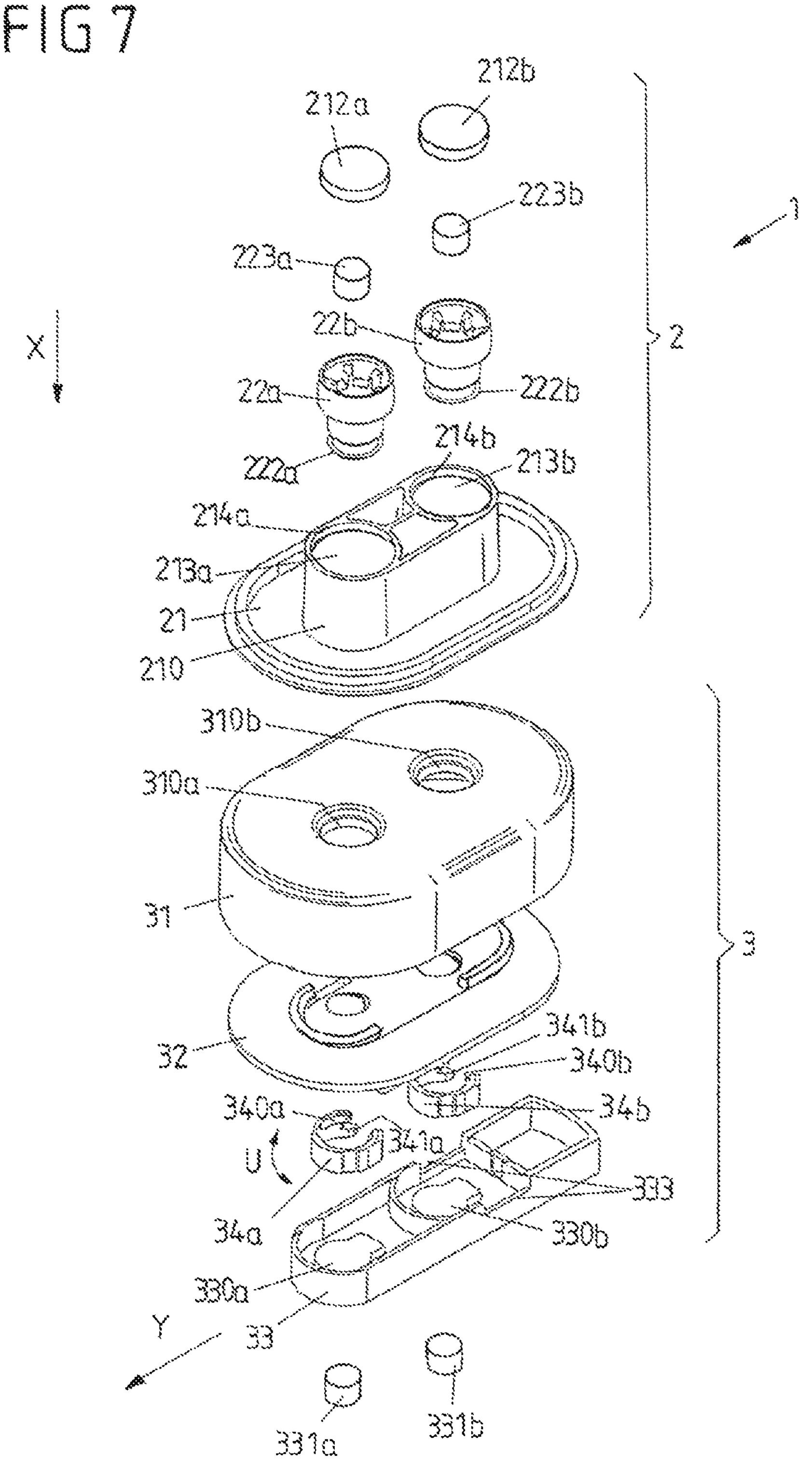
FIG. 7 shows an exploded view of a further exemplary embodiment of a closing device.

One magnet 212*a*, 212*b* which closes the receptacle chamber 213*a*, 213*b* on the rear side (that is to say toward a side that in the closing position faces away from the other, the second, closing part 3) is in each case disposed on receptacle openings 214*a*, 214*b* of the housing portion 210 (cf. FIG. 7).

The second closing part 3 has a housing 31 on which a housing part 32 is placed. An adjustment element 33 which, on the one hand, supports in a rotationally fixed manner two sprung locking elements 34*a*, 34*b* on holding portions 330*a*, 330*b*, and on the other hand is connected to magnets 331*a*, 331*b* by way of receptacle openings 232*a*, 232*b* is disposed on the housing part 32 which is fixedly connected to the housing 31.

Figure 8:
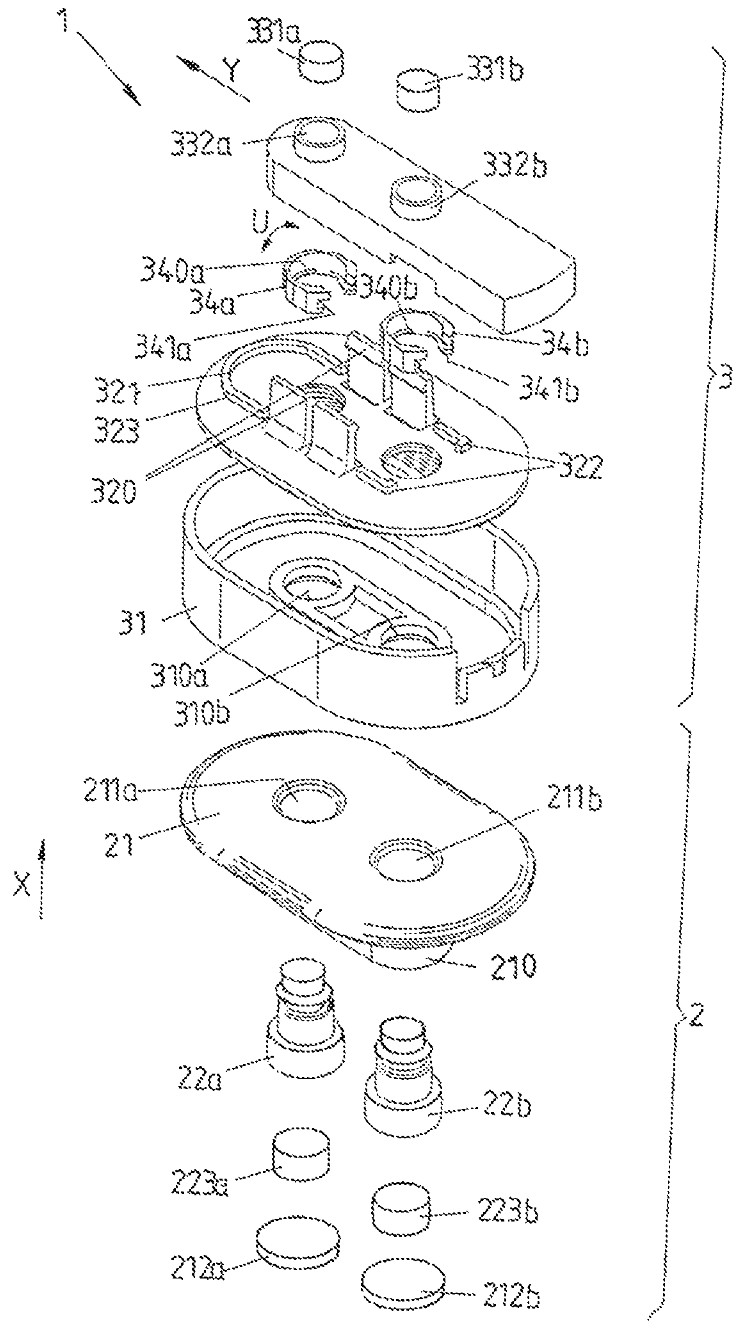
FIG. 8 shows an exploded view of the closing device according to FIG. 7, viewed from another perspective.

The adjustment element 33 by way of positive-locking elements 320 is held on the housing part 32 so as to be displaceable along the opening direction Y, and along longitudinal guiding portion 323 can be displaced relative to the housing part 32 (see FIG. 8).

Terminal positions of the adjustment element 33 along the opening direction Y are defined by a detent portion 321, on the one hand, and by detents 322 which lie in recesses 333 on the adjustment element 33, on the other hand.

Figure 9A:
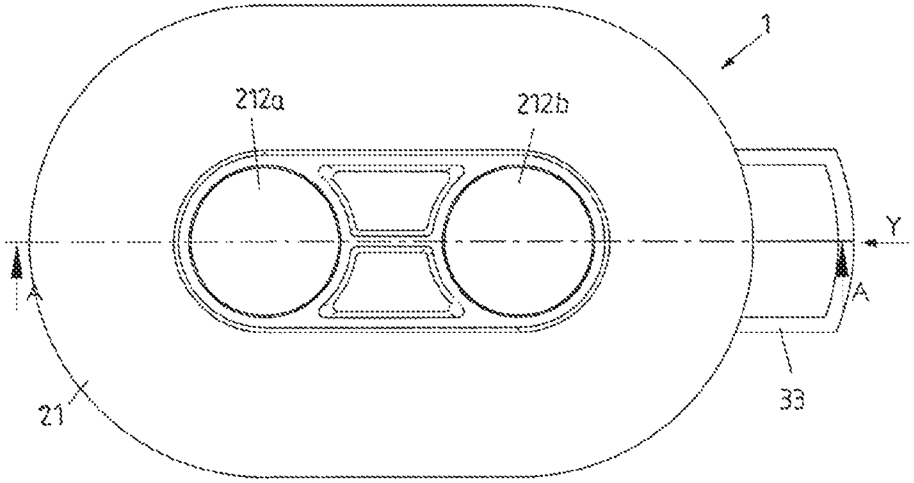
FIG. 9A shows a plan view of the closing device prior to the closing.
Figure 9B:
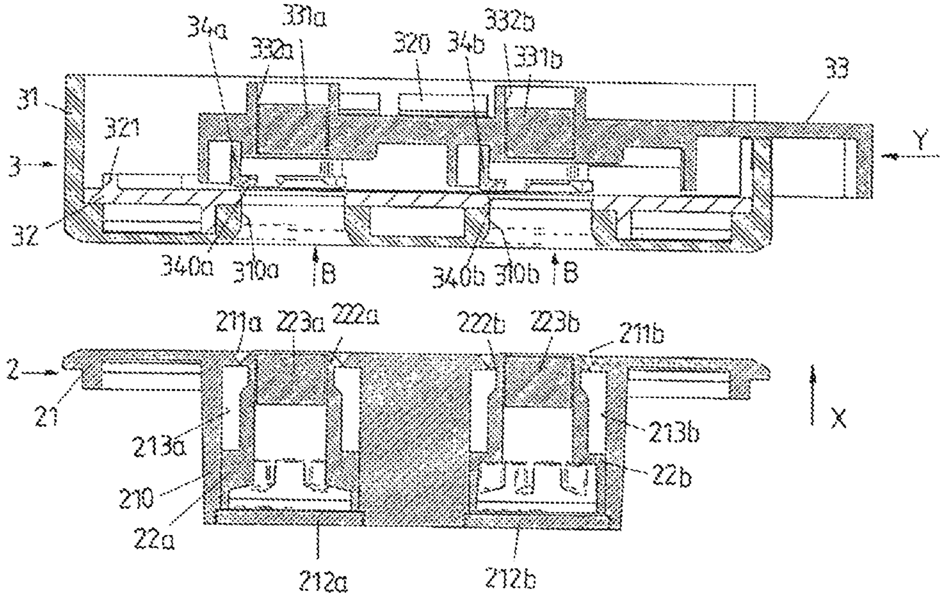
FIG. 9B shows a sectional view of the assembly according to FIG. 9A along the line A-A.
Figure 10A:
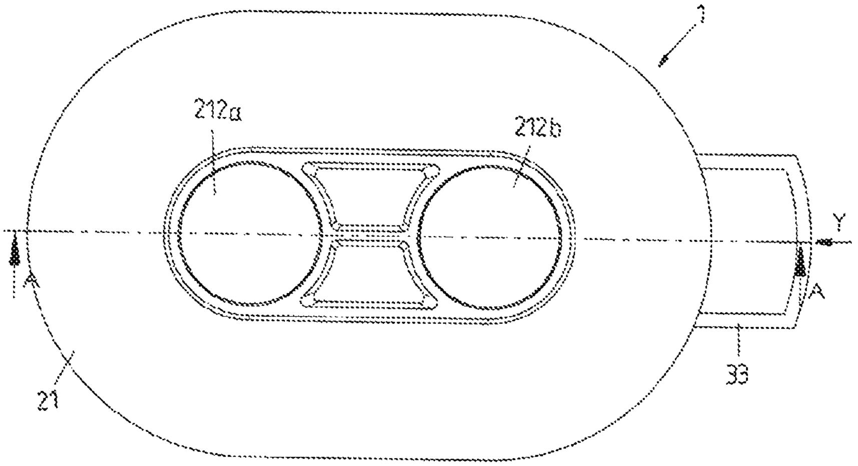
FIG. 10A shows a plan view of the closing device prior to the closing.
Figure 10B:
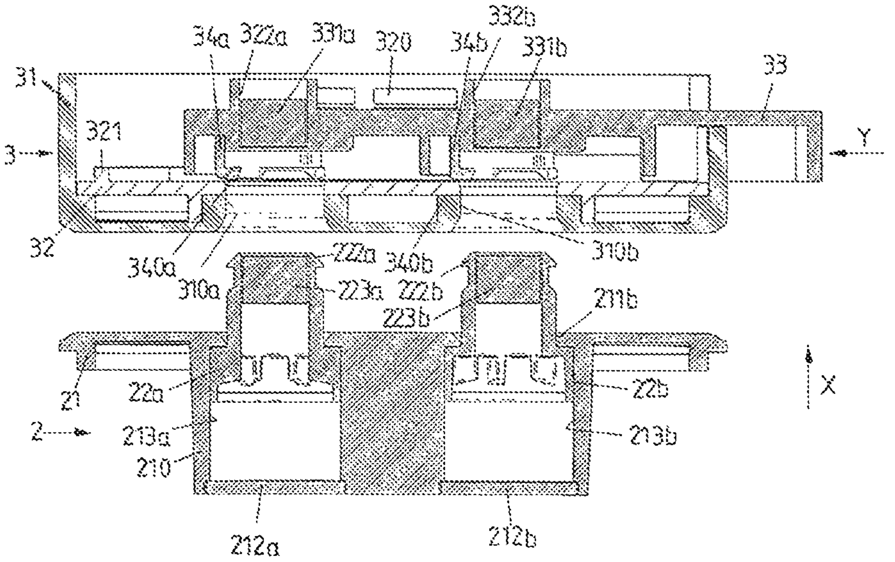
FIG. 10B shows a sectional view of the assembly according to FIG. 10A along the line A-A.
Figure 11A:
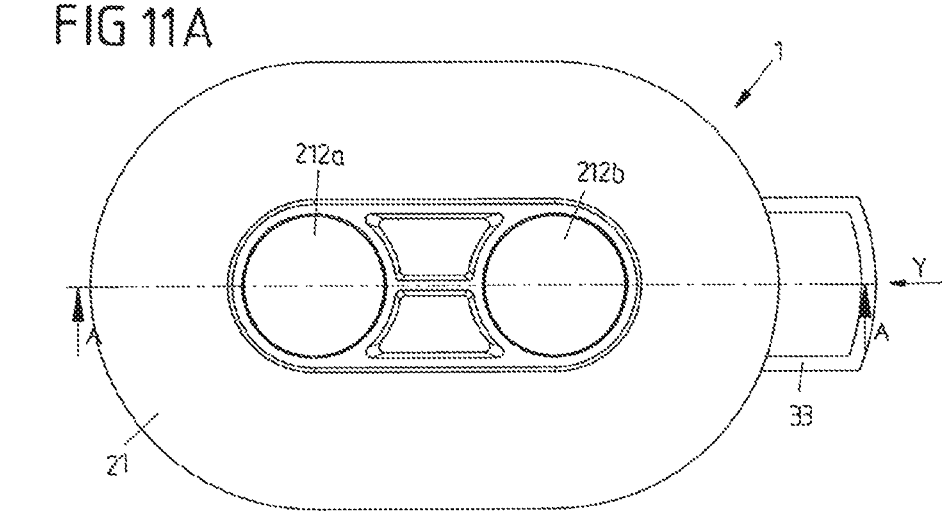
FIG. 11A shows a plan view of the closing device in the closing position.
Figure 11B:
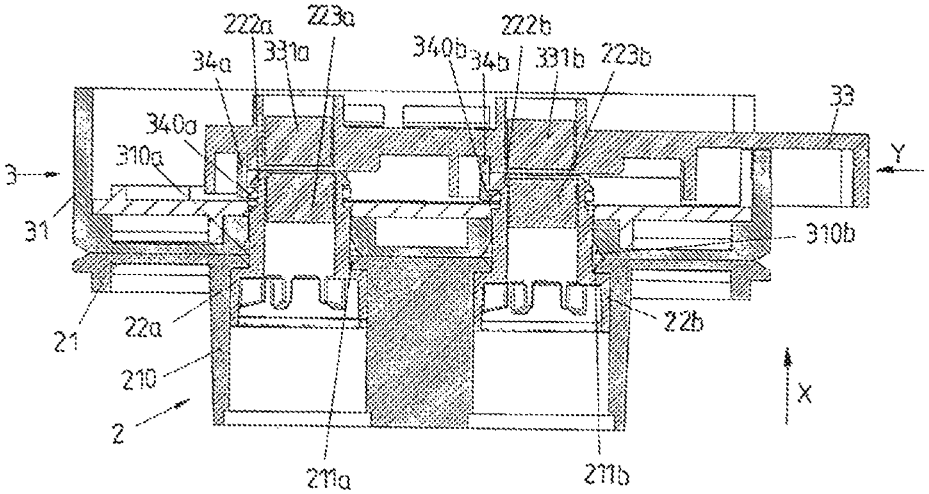
FIG. 11B shows a sectional view of the assembly according to FIG. 11A along the line A-A.

FIGS. 9A and 9B show the closing device 1 in a state prior to the closing. The blocking pieces 22*a*, 22*b* of the first closing part 2 in this state are retracted into the receptacle chambers 213*a*, 213*b* on the housing portion 210, and do not project outward beyond the housing 21, or at least not in a disturbing manner. When the first closing part 2 is moved closer to the second closing part 3, in an analogous manner as has been described above in the context of the embodiment according to FIGS. 1 to 6, magnetic attraction forces between the magnets 223*a*, 223*b*, 231*a*, 231*b* on the blocking pieces 22*a*, 22*b*, on the one hand, and on the adjustment element 33, on the other hand, have the effect that the blocking pieces 22*a*, 22*b* from the retracted position thereof are transferred to a deployed position illustrated in FIGS. 10A and 10B.

The blocking pieces 22*a*, 22*b* in the deployed position extend in each case through openings 211*a*, 211*b* on the housing 211, and in the direction of the second closing part 3 project outward from the housing 21.

The blocking pieces 22*a*, 22*b* in this deployed position can be introduced into receptacle openings 310*a*, 310*b* on the housing 31 of the second closing part 3, so as to be brought to engage in a latching manner with the sprung locking elements 34*a*, 34*b*. The latching portions 222*a*, 222*b* of the blocking pieces 22*a*, 22*b* in the latched state, corresponding to the closing position of the closing device 1 and illustrated in FIGS. 11A and 11B, then engage with the latching portions 340*a*, 340*b* of the sprung locking elements 34*a*, 34*b* such that the first closing part 2 by way of said engagement is held in a latching, positive-locking manner on the second closing part 3.

Figure 12A:
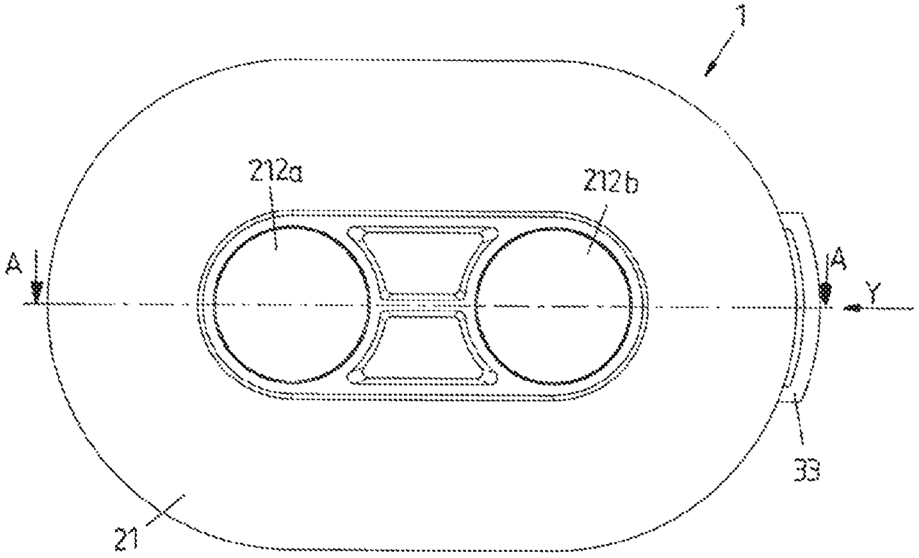
FIG. 12A shows a plan view of the closing device in the unlocked state.
Figure 12B:
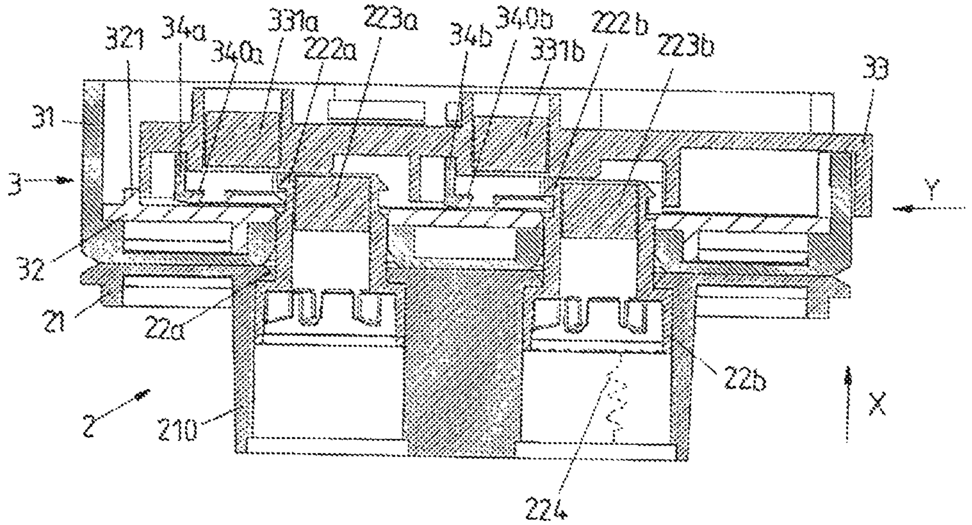
FIG. 12B shows a sectional view of the assembly according to FIG. 12A along the line A-A.

In order for the closing device 1 to be opened, the adjustment element 33 conjointly with the sprung locking elements 34*a*, 34*b* disposed thereon, is moved relative to the blocking pieces 22*a*, 22*b* in the opening direction Y, as is illustrated in FIGS. 12A, 12B. The blocking pieces 22*a*, 22*b* on account thereof are moved through circumferential openings 341*a*, 341*b* of the sprung locking elements 34*a*, 34*b* and disengage from the sprung locking elements 34*a*, 34*b* such that the locking mechanism between the first closing part 2 and the second closing part 3 is cancelled and the blocking pieces 22*a*, 22*b* can be retrieved from the receptacle openings 310*a*, 310*b* of the housing 31 of the second closing part 3 in order for the first closing part 2 to be removed from the second closing part 3.

As is illustrated in FIG. 12B, the adjustment element 33 in the unlocked state bears on the detent portion 321 of the housing part 32. Said detent portion 321 thus defines a terminal position for the unlocked state in which the engagement between the sprung locking elements 34*a*, 34*b* and the blocking pieces 22*a*, 22*b* is cancelled.

In analogous manner as has been described above in the context of the embodiment according to FIGS. 1 to 6, the blocking pieces in the direction of the retracted position thereof by way of magnetic pretensioning means are pretensioned in relation to the housing 21 also in the case of the embodiment according to FIGS. 7 to 12. To this end, the magnets 223*a*, 223*b* on the blocking pieces 22*a*, 22*b* lie opposite the magnets 212*a*, 212*b* on the housing portion 210 in attracting manner such that the blocking pieces 22*a*, 22*b* by virtue of said magnetic restoring force are reset to the retracted position thereof according to FIG. 9B once the first closing part 2 has been retrieved from the second closing part 3.

Instead of magnetic pretensioning means in the form of the magnet 212 in the case of the embodiment according to FIGS. 1 to 6, or the magnets 212*a*, 212*b* in the embodiment according to FIGS. 7 to 12, respectively, a mechanical spring 224 can also be used, said mechanical spring 224 acting between the blocking piece 22, or the blocking pieces 22*a*, 22*b*, respectively, and the housing portion 210, as is schematically illustrated for the blocking piece 22*b* in FIG. 12B. Such a spring 224 causes a mechanical restoring force which causes the blocking piece 22, or the blocking pieces 22*a*, 22*b*, respectively, to reset to the retracted position as soon as the restoring force exceeds the magnetic attraction force of the magnetic means between the blocking piece 22 and the second closing part 3, or the blocking pieces 22*a*, 22*b* and the second closing part 3, respectively.

Figure 13A:
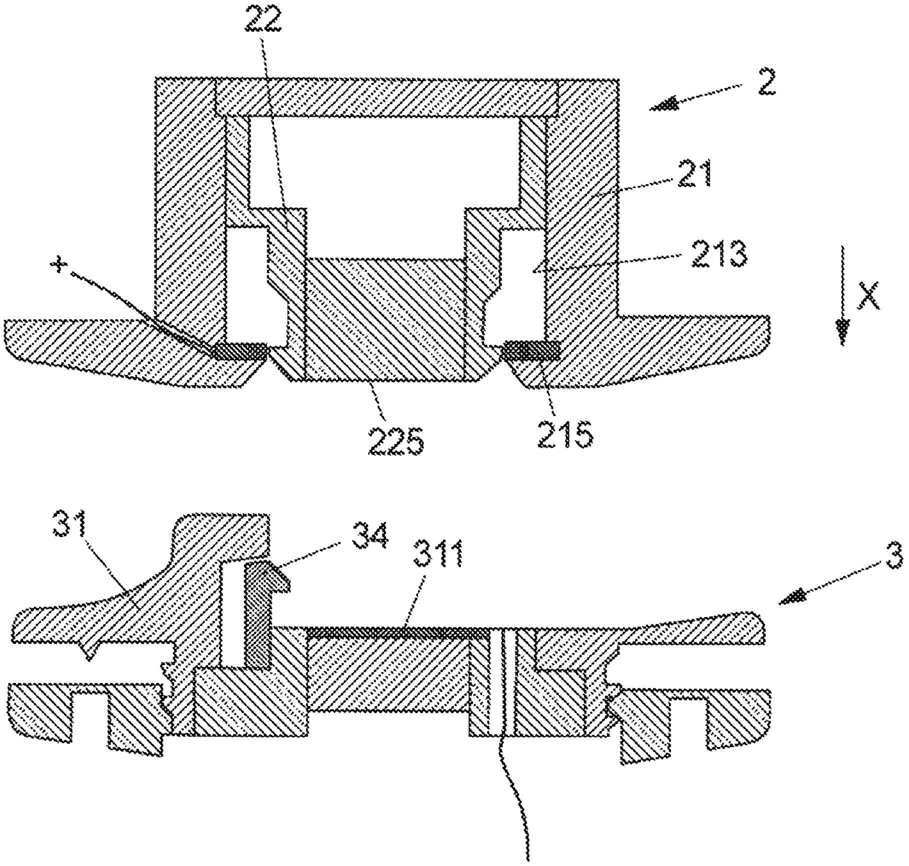
FIGS. 13A-13C show the exemplary embodiment according to FIGS. 1 to 6A, 6B having electrical contacts.
Figure 13B:
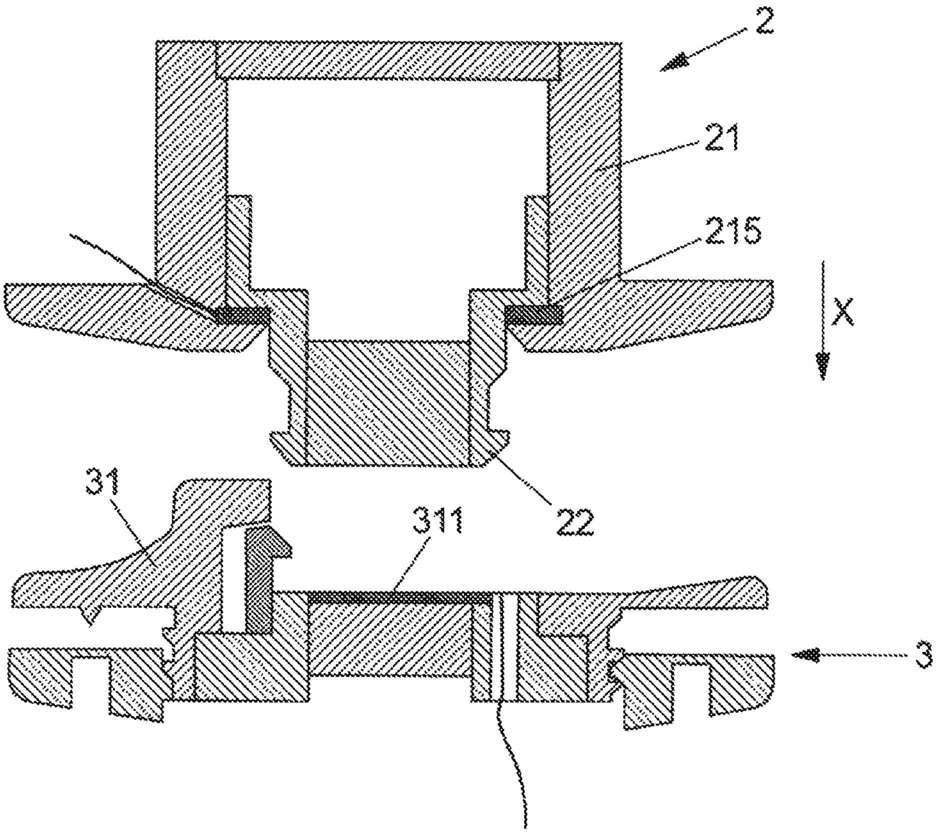
Figure 13C:
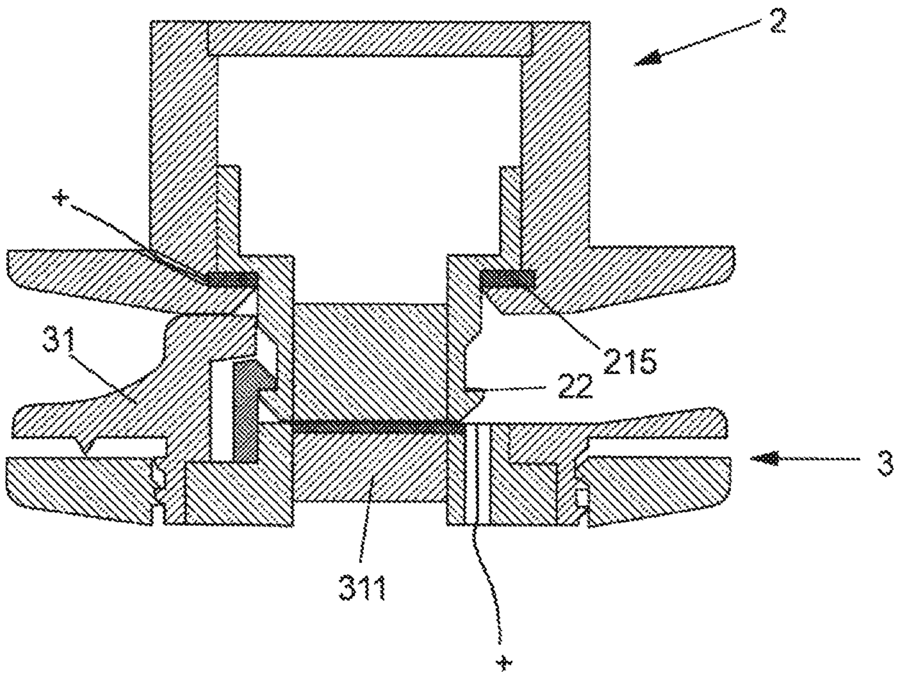
Figure 14A:
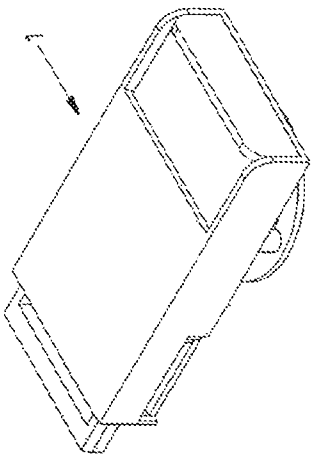
FIGS. 14A-14D to 17A-17D show a further exemplary embodiment of a closing device having electrical contacts.
Figure 14B:
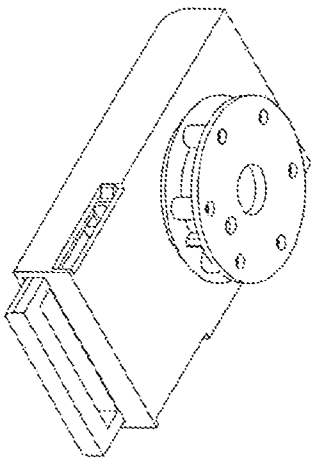
Figure 14C:
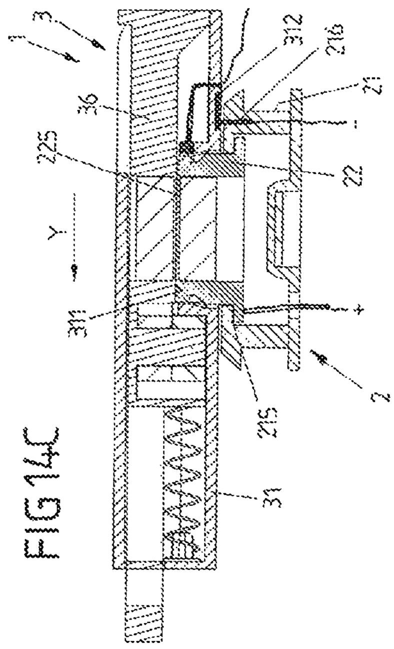
Figure 14D:
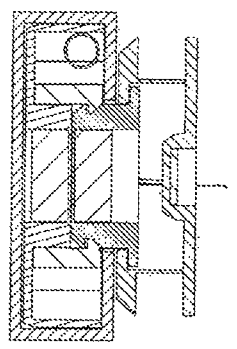
Figure 15E:
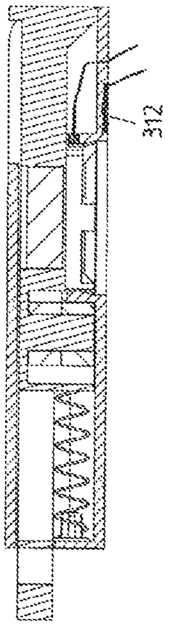
Figure 15F:
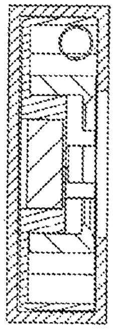
Figure 15C:
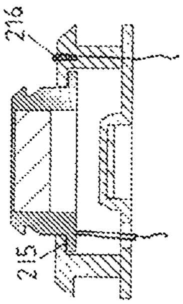
Figure 15D:
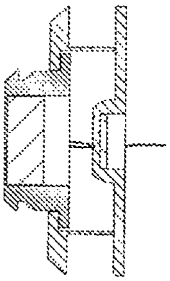
Figure 15A:
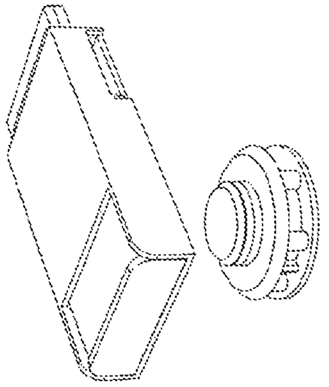
Figure 15B:
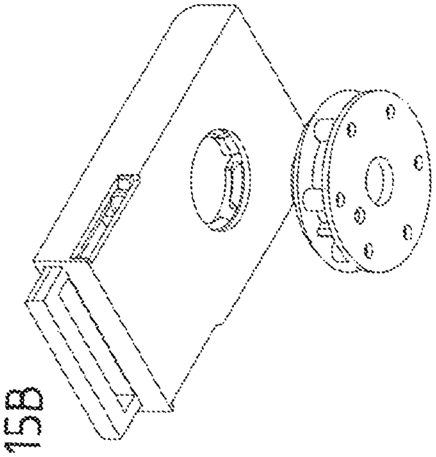
Figure 16F:
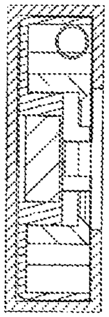
Figure 16E:
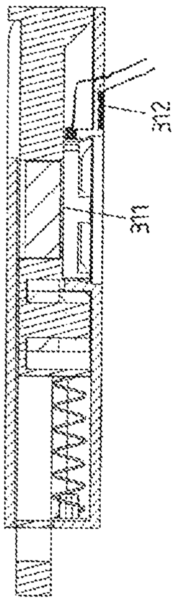
Figure 16D:
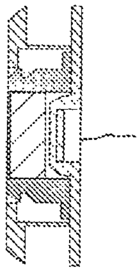
Figure 16C:
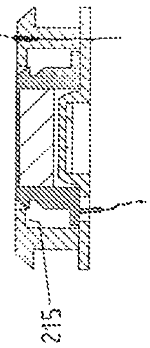
Figure 16B:
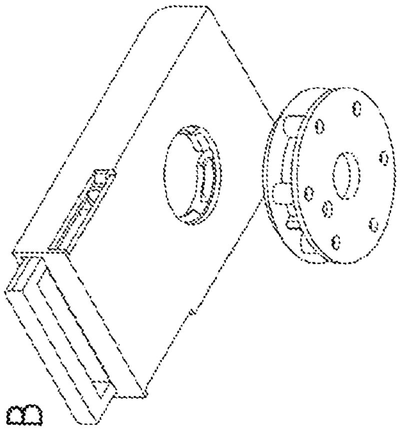
Figure 16A:
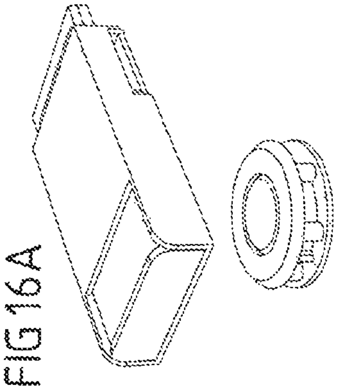

In the case of an embodiment illustrated in FIGS. 13A to 13C, which in terms of the mechano-magnetic function thereof corresponds to the embodiment according to FIGS. 1A to 6A, 6B, a contact element 225 which in the closing position of the closing device 1 contacts a contact element 311 on the housing 31 of the second closing part 3, as is illustrated in FIG. 13C, is configured on the blocking piece 22 of the first closing part 2.

The contact element 225 can be configured as a separate, electrically conductive, element on the blocking piece 22. However, the blocking piece 23 overall can also be electrically conducting.

The blocking piece 22 in the case of the embodiment illustrated is not energized in the retracted position (FIG. 13A). The blocking element 22 contacts an assigned contact 215 on the housing 21 of the first closing part 2 only once the blocking piece 22 has been deployed (FIG. 13B), such that the contact element 215 of the blocking piece 22 by way of said contact 215 is electrically connected and in the closing position (FIG. 13C) can electrically contact the contact element 311 of the other, the second, closing part 3.

Reference is otherwise fully made to the explanations pertaining to the embodiment according to FIGS. 1 to 6A, 6B.

In the case of an embodiment illustrated in FIGS. 14A-14D to 17A-17D a further contact element 216 which in the closing position of the closing device 3 electrically contacts an assigned contact element 312 on the housing 31 of the other, the second, closing part 3 (see FIG. 14C) is disposed on the housing 21 of the first closing part 2. A first electrical connection between the closing parts 2, 3 is thus achieved by way of the blocking piece 22 and the contact 225 provided thereon in the closing position, and a second electrical connection between the closing parts 2, 3 is achieved by way of the contacts 216, 312 on the housings 21, 32, such that currents of dissimilar polarity (+, −) can be transmitted between the closing parts 2, 3.

Figure 17D:
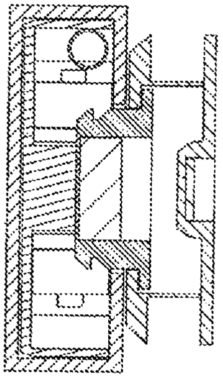
Figure 17C:
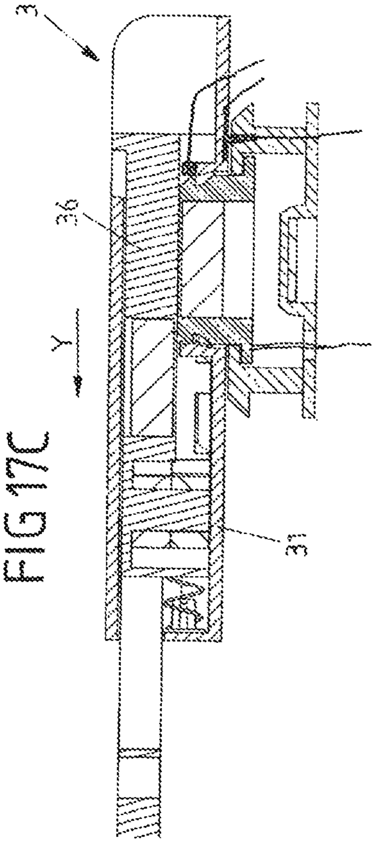
Figure 17B:
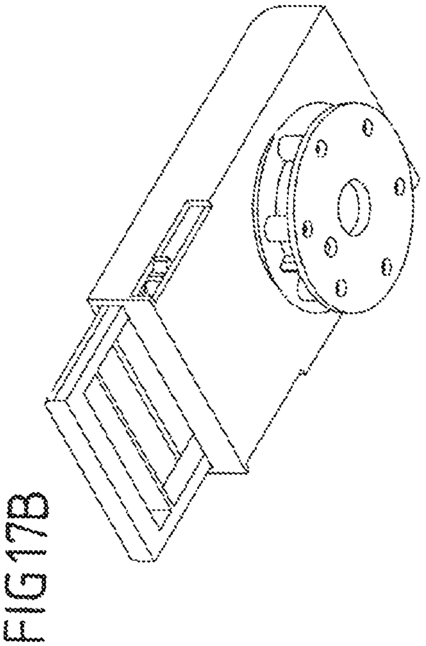
Figure 17A:
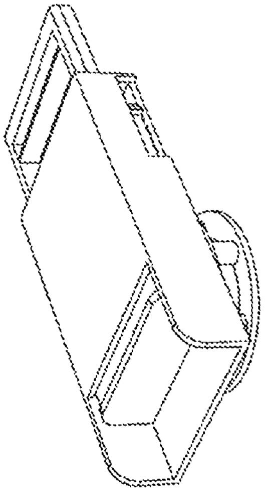
Figure 18E:
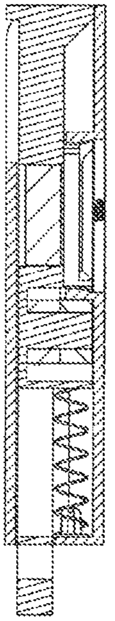
FIGS. 18A-18F to 22A-22F show a further exemplary embodiment of a closing device having electrical contacts.
Figure 18F:
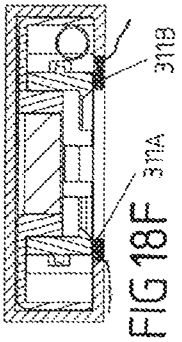
Figure 18C:
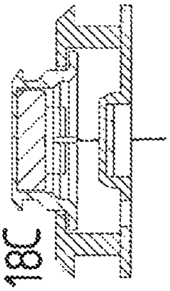
Figure 18D:
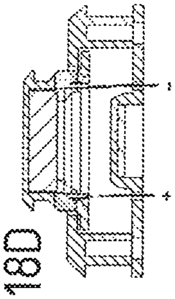
Figure 18A:
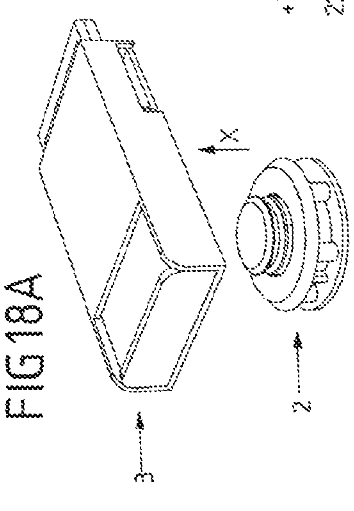
Figure 18B:
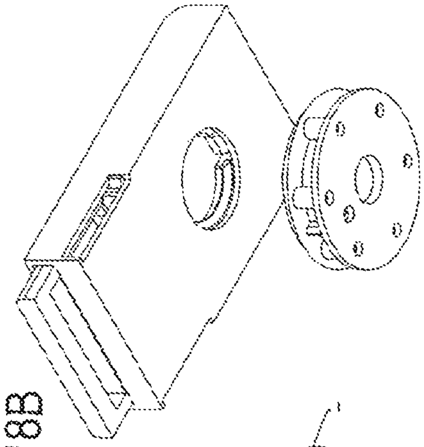

In the case of the embodiment illustrated, the opening of the closing device 1 is performed by displacing an adjustment element 36 in the housing 31 of the second closing part 3 in an opening direction Y, as is illustrated in FIGS. 17A-17C. On account thereof, the engagement of the blocking piece 22 with an assigned latching element on the second closing part 3 is cancelled such that the first closing part 2 can be retrieved from the second closing part 3.

Figure 19:
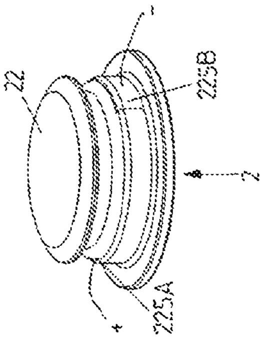
Figure 20D:
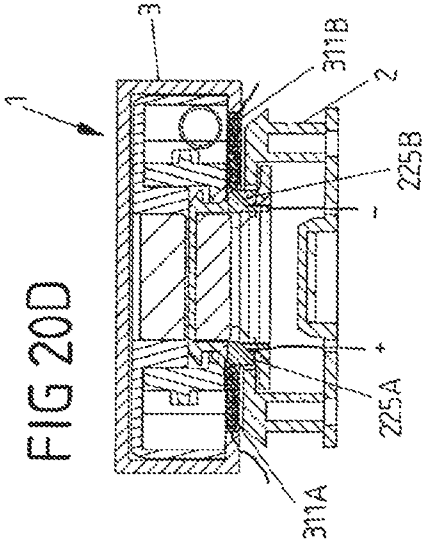
Figure 20B:
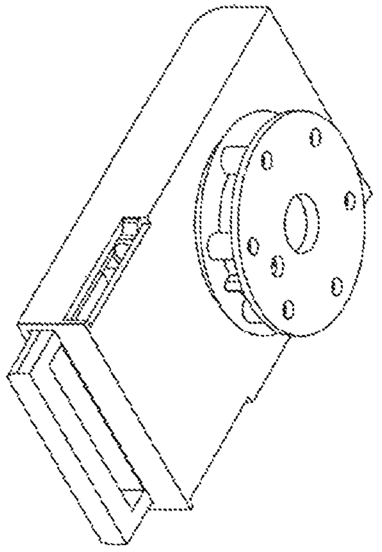
Figure 20C:
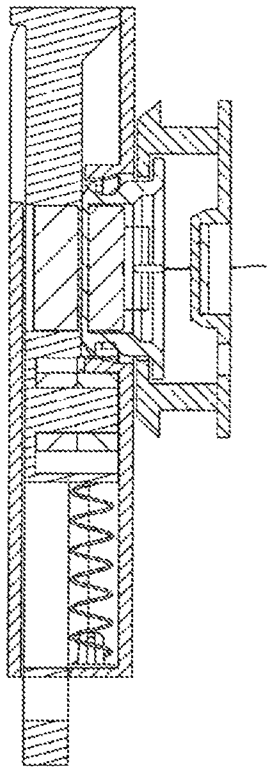
Figure 20A:
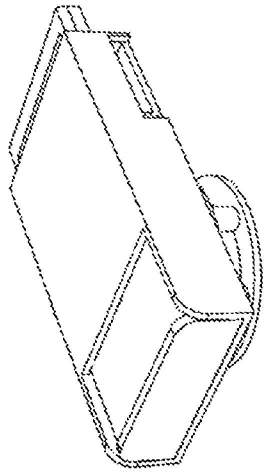
Figure 21D:
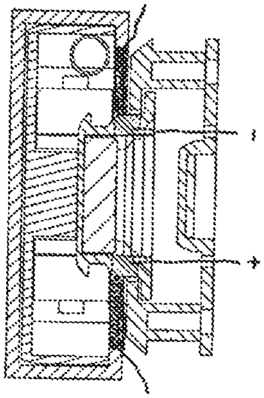
Figure 21B:
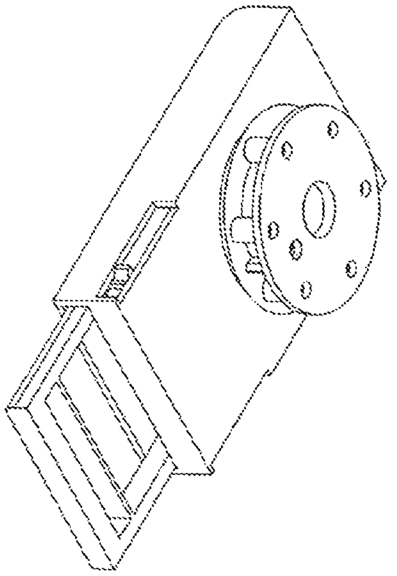
Figure 21C:
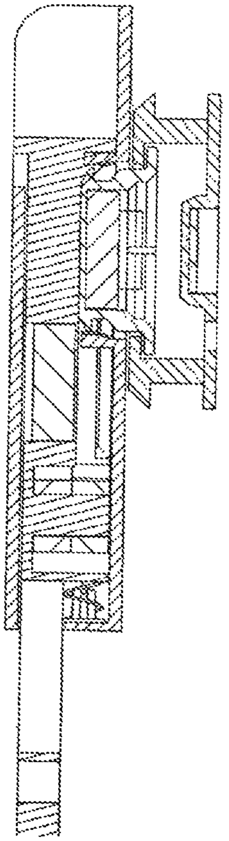
Figure 21A:
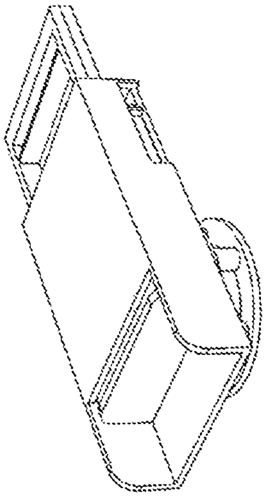
Figures 22A, 22B, 22C, 22D, 22E, 22F:
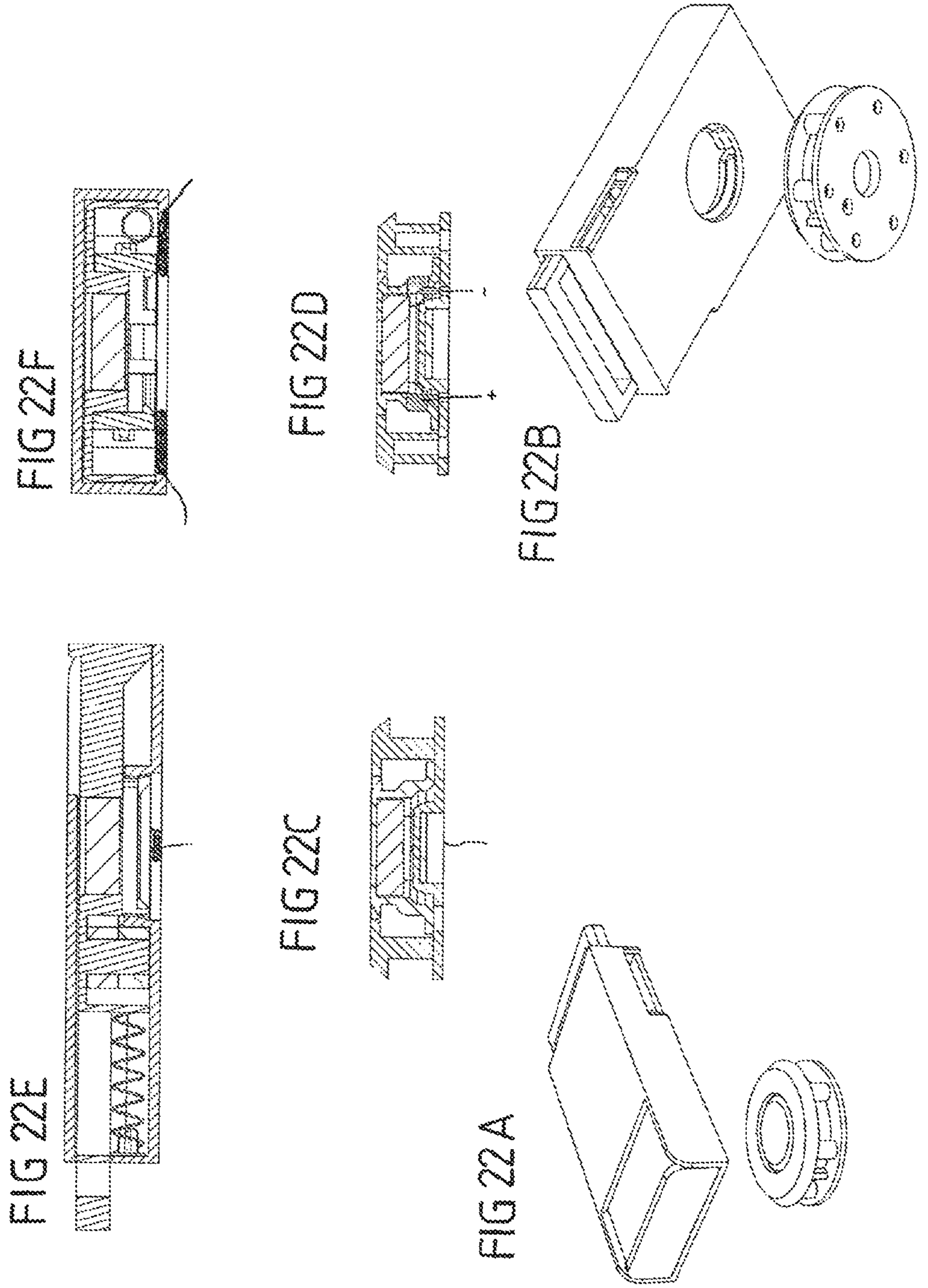
Figures 23A, 23B, 23C, 23D, 23E, 23F, 24:
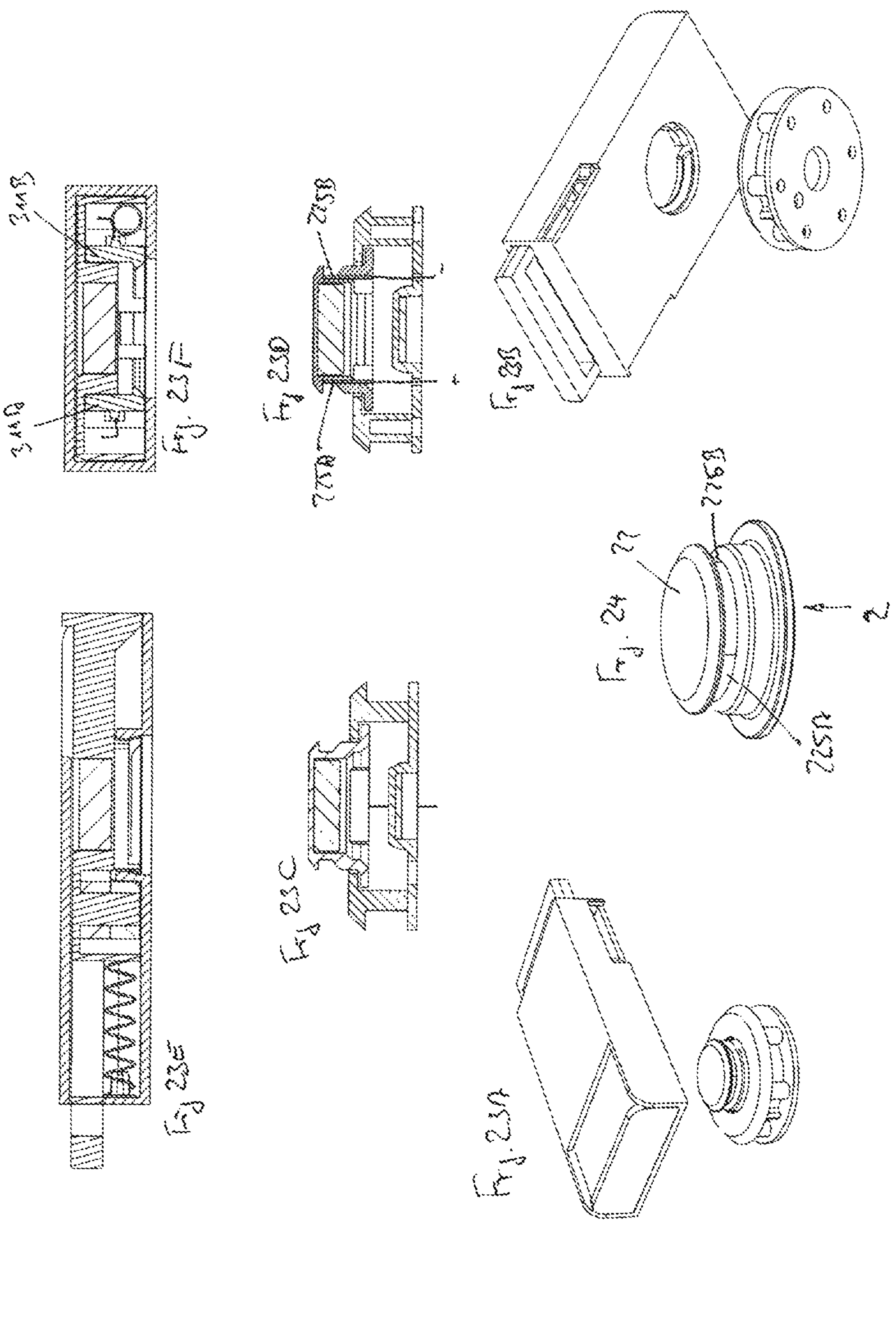
FIGS. 23A-23F to 27A-27F show a further exemplary embodiment of a closing device having electrical contacts.

In the case of an embodiment illustrated in FIGS. 18A-18F to 22A-22F, two contact elements 225A, 225B which in the closing position of the closing device 1 contact different assigned contact elements 311A, 311B of the second closing part 3, as can be seen from FIG. 20B, for example, are disposed on the blocking piece, as can be seen from the specific view according to FIG. 19.

In the case of an embodiment illustrated in FIGS. 23A-23F to 27A-27F, contact elements of a different type are provided on the blocking piece 22 of the first closing part 2, as can be seen from FIG. 13B, for example. The contact elements 225A, 225B of the first closing part 2 in the closing position again contact assigned contact elements 311A, 311B of the second closing part 3, as can be seen from FIG. 25C, for example.

Figure 25D:
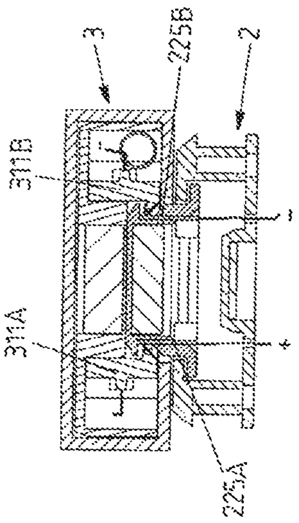
Figure 25B:
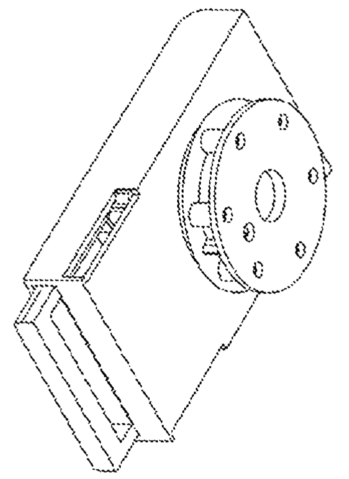
Figure 25C:
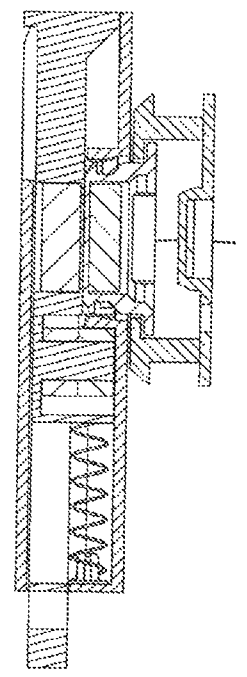
Figure 25A:
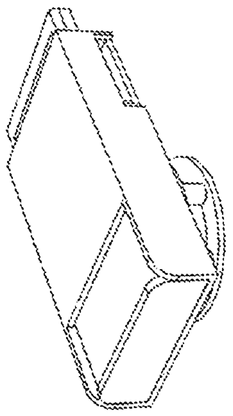
Figure 26D:
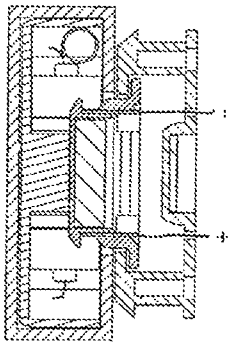
Figure 26B:
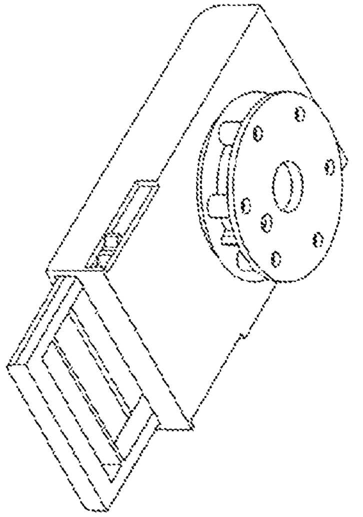
Figure 26C:
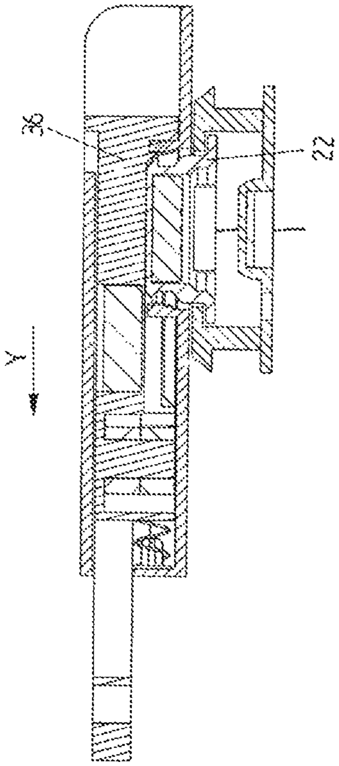
Figure 26A:
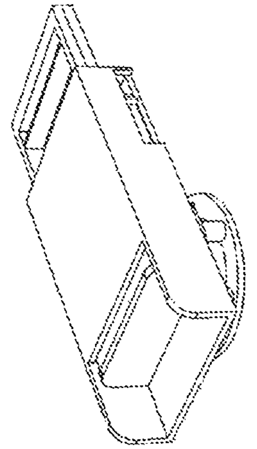
Figure 27F:
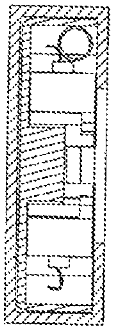
Figure 27E:
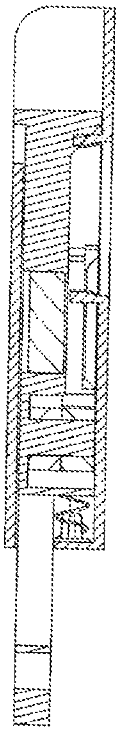
Figure 27D:
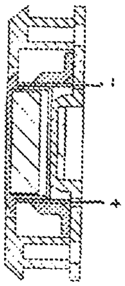
Figure 27C:
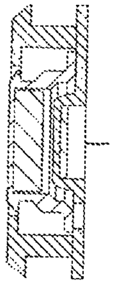
Figure 27B:
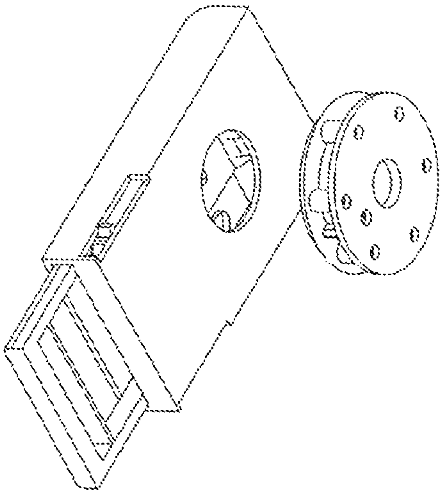
Figure 27A:
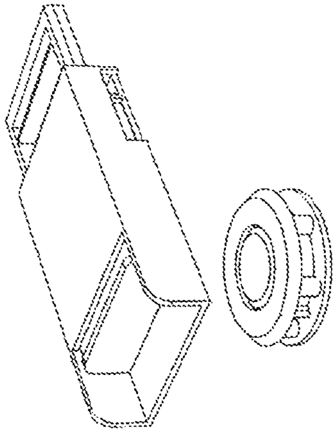
Figure 28:
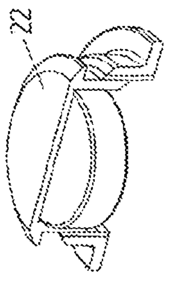
FIGS. 28-31 show various aspects of assemblies of contact elements on a blocking piece of a closing device.
Figure 29:
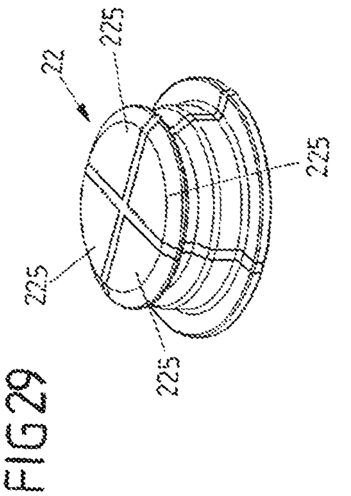
Figure 30:
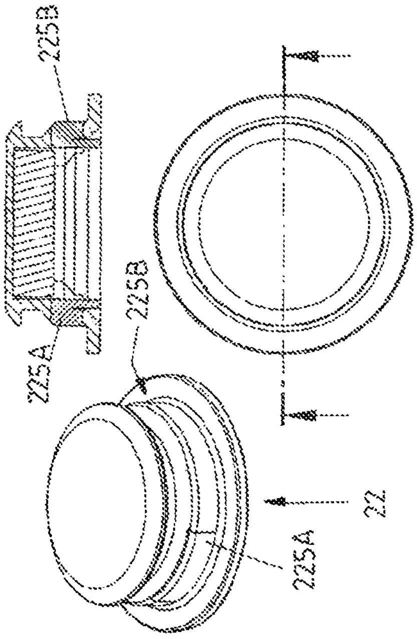
Figure 31:
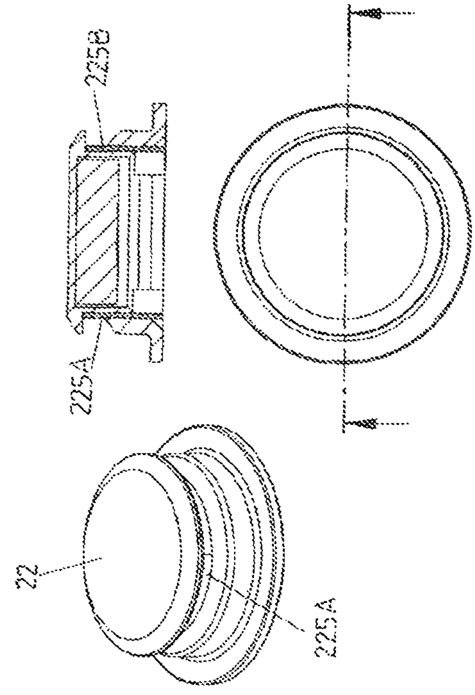

The contact elements 311A, 311B of the second closing part 3 in this case are also configured by latching elements which are disposed so as to be pivotable on the second closing part 3 and which in the closing position also establish the latching action with the blocking piece 22, as can be seen from FIG. 25D. The latching elements can be brought to disengage from the blocking piece 22 by adjusting an adjustment element 36 for opening the closing device 1 (see FIG. 26C).

FIGS. 28-31 show different arrangements of contact elements 225, 225A, 225B on the blocking piece 22 of the first closing part 2.

LIST OF REFERENCE SIGNS

1 Closing device
2 Closing part
21 Housing
210 Housing portion
211, 211*a*, 211*b* Opening
212, 212*a*, 212*b* Magnet
213, 213*a*, 213*b* Receptacle chamber
214, 214*a*, 214*b* Receptacle opening
215, 216 Contact element
22, 22*a*, 22*b* Blocking piece
222, 222*a*, 222*b* Latching portion
223, 223*a*, 223*b* Magnet
224 Spring
225, 225A, 225B Contact element
3 Closing part
31 Housing
310, 310*a*, 310*b* Receptacle opening
311, 311A, 311B, Contact element
312
32 Housing part
320 Positive-locking elements
321 Detent portion
322 Detents
323 Longitudinal guiding portion
33 Adjustment element
330, 330*a*, 330*b* Holding portion
331, 331*a*, 331*b* Magnet
332, 332*a*, 332*b* Receptacle opening
333 Recesses
34, 34*a*, 34*b* Sprung locking element
340, 340*a*, 340*b* Latching portion
341, 341*a*, 341*b* Opening
35 Receptacle opening
36 Adjustment part
B Moving direction
U Circumferential direction
X Closing direction
Y Opening direction

The invention claimed is:

1. A closing device comprising:

a first closing part which has a housing and a blocking piece disposed on the housing;

a second closing part which has a sprung locking element which at least in portions is configured so as to be spring-elastic; and magnetic means which act between the blocking piece of the first closing part and the second closing part and cause a magnetic attraction force between the blocking piece of the first closing part and the second closing part, wherein the first closing part for closing the closing device is capable of being placed on the second closing part in a closing direction;

wherein the blocking piece and the sprung locking element in a closing position are mutually engaged such that the first closing part in the direction counter to the closing direction is locked in relation to the second closing part;

wherein the sprung locking element for releasing the closing device is displaceable relative to the blocking piece in an opening direction that is substantially transverse to the closing direction, so as to disengage the sprung locking element and the blocking piece, wherein the blocking piece is disposed so as to be movable on the housing of the first closing part such a manner that said blocking piece in a retracted position is at least in part enclosed in a receptacle chamber of the housing, and in a deployed position projects from the housing in such a manner that said blocking piece can be brought to engage with the sprung locking element, and wherein at least one first electrical contact element is disposed on the blocking piece and/or the housing, and at least one second electrical contact element is disposed on the second closing part.

2. The closing device as claimed in claim 1, wherein the blocking piece in the retracted position does not project outward from the housing.

3. The closing device as claimed in claim 1, wherein the transferring of the blocking piece from the retracted position to the deployed position by way of the magnetic means is caused when placing the first closing part on the second closing part.

4. The closing device as claimed in claim 1, wherein the magnetic means acting in an attracting manner between the blocking piece are dimensioned such that the blocking piece, when placing the first closing part on the second closing part, is held in the deployed position for bringing the blocking piece to engage in a latching manner with the sprung locking element.

5. The closing device as claimed in claim 1, wherein the blocking piece relation to the housing of the first closing part is pretensioned to the retracted position.

6. The closing device as claimed in claim 5, wherein the blocking piece in relation to the housing of the first closing part is pretensioned by magnetic pretensioning means or by a mechanical spring.

7. The closing device as claimed in claim 1, wherein the second closing part has an adjustment element and a housing, and wherein the adjustment element is mounted on the housing so as to be displaceable along the opening direction and supports the sprung locking element.

8. The closing device as claimed in claim 7, wherein the magnetic means act between the blocking piece of the first closing part and the adjustment element of the second closing part.

9. The closing device as claimed in claim 1, wherein the sprung locking element extends in a circumferential direction about the closing direction, and in the closing position encompasses the blocking piece at least in portions in the circumferential direction.

10. The closing device as claimed in claim 9, wherein the sprung locking element is circumferentially opened in the opening direction.

11. The closing device as claimed in claim 1, wherein the at least one first electrical contact element and the at least one second electrical contact element in the closing position are in mutual electrical contact.

12. The closing device as claimed in claim 1, wherein the blocking piece has a plurality of first electrical contact elements for contacting a second contact elements of the second closing part.

13. The closing device as claimed in claim 1, wherein the blocking piece in the deployed position is contacted by way of a contact element of the housing of the first closing part.

14. The closing device as claimed in claim 13, wherein the blocking piece in the retracted position is not contacted by way of the contact element of the housing of the first closing part.

15. The closing device as claimed in claim 1, wherein the housing of the first closing part has at least one contact element which in the closing position is contacted by way of at least one contact element of the second closing part.

* * * * *